(12) United States Patent
Makropoulos

(10) Patent No.: US 7,621,206 B2
(45) Date of Patent: Nov. 24, 2009

(54) MULTI-FUNCTION WOODWORKING GUIDE

(76) Inventor: Dino Makropoulos, 30 Riverview Ave., Edison, NJ (US) 08817

( * ) Notice: Subject to any disclaimer, the term of this patent is extended or adjusted under 35 U.S.C. 154(b) by 867 days.

(21) Appl. No.: 10/178,156

(22) Filed: Jun. 24, 2002

(65) Prior Publication Data

US 2003/0233922 A1    Dec. 25, 2003

(51) Int. Cl.
   *B26D 5/08*    (2006.01)
(52) U.S. Cl. ............... 83/574; 83/821; 83/477.1; 144/144.52; 409/178
(58) Field of Classification Search ............... 83/745, 83/442, 761, 829, 441.1, 574, 468.1, 468.4, 83/471.2, 477.2, 455; 33/403, 465, 466; 144/144.51, 144.52, 144.1, 134.1, 136.95, 144/136.7; 409/175, 178, 179, 181
See application file for complete search history.

(56) References Cited

U.S. PATENT DOCUMENTS

| | | | | |
|---|---|---|---|---|
| 3,127,680 A | * | 4/1964 | Brichard et al. ............... 33/32.3 |
| 3,186,452 A | * | 6/1965 | Magnussen ................... 83/745 |
| 3,298,407 A | * | 1/1967 | Scott ........................... 83/489 |
| 3,373,781 A | * | 3/1968 | Grosswald ................... 83/745 |
| 3,635,268 A | * | 1/1972 | Lange ...................... 144/154.5 |
| 3,830,130 A | * | 8/1974 | Moore ........................ 83/745 |
| 3,869,951 A | | 3/1975 | Litwin |
| 3,983,776 A | | 10/1976 | Flanders |
| 4,016,649 A | | 4/1977 | Kloster |
| 4,050,340 A | | 9/1977 | Flanders |
| 4,065,114 A | | 12/1977 | Pennington |
| 4,075,920 A | * | 2/1978 | Neal ............................ 83/745 |
| 4,077,290 A | * | 3/1978 | Hreha ........................ 83/471.2 |
| 4,155,383 A | * | 5/1979 | Welliver ................... 144/154.5 |
| 4,202,233 A | * | 5/1980 | Larson ........................ 83/745 |
| 4,350,066 A | * | 9/1982 | Volk ........................... 83/763 |
| 4,394,800 A | * | 7/1983 | Griset ......................... 33/443 |
| 4,409,873 A | * | 10/1983 | Kundikoff .................... 83/745 |
| 4,453,438 A | * | 6/1984 | Zelli ........................... 83/745 |
| 4,463,644 A | * | 8/1984 | Ferdinand et al. ............. 83/745 |
| 4,660,450 A | | 4/1987 | Rafalow |
| 4,945,799 A | | 8/1990 | Knetzer |
| 4,947,910 A | * | 8/1990 | Reneau ....................... 144/371 |
| 4,995,288 A | | 2/1991 | DellaPolla |
| 5,035,061 A | * | 7/1991 | Bradbury et al. .............. 33/430 |
| 5,038,841 A | * | 8/1991 | Larmon ...................... 144/371 |
| 5,083,375 A | * | 1/1992 | Helm, Sr. ..................... 30/294 |

(Continued)

OTHER PUBLICATIONS

FESTOOL USA, Tools and Accessories, 2002/2003 (Catalog), Jul. 2002, pp. 1-11, 16-20, 26-27, 40-42, 68-71.

*Primary Examiner*—Kenneth E. Peterson
*Assistant Examiner*—Sean Michalski
(74) *Attorney, Agent, or Firm*—Ash Tankha

(57) ABSTRACT

The multi-functional woodworking guide is a modular portable universal guide, adapted for guiding multiple hand held power tools, that is extendable with the use of multiple guide plates, side bars and edge bars in order to increase the size of the guide device to any length, thus being capable of cutting, grooving or sanding an unlimited length of material with the use of side extension clamps. The multi-functional woodworking guide is compact, portable and easy to transport, as it fits into the back seat or trunk of a car. The multi-functional woodworking guide is easy to secure to a work piece by various integrated clamps, which do not have to be move when cutting, grooving or sanding the material.

28 Claims, 29 Drawing Sheets

U.S. PATENT DOCUMENTS

| | | | | |
|---|---|---|---|---|
| 5,203,389 A * | 4/1993 | Goodwin | | 144/356 |
| 5,230,269 A * | 7/1993 | Shiotani et al. | | 83/468.7 |
| 5,427,006 A | 6/1995 | Finley | | |
| 5,472,029 A * | 12/1995 | Ketch | | 144/371 |
| 5,619,896 A * | 4/1997 | Chen | | 83/477.2 |
| 5,682,934 A * | 11/1997 | Rybski | | 144/144.51 |
| 5,740,847 A * | 4/1998 | Lakso | | 144/144.52 |
| 5,778,949 A * | 7/1998 | Draves | | 144/48.6 |
| 5,815,931 A | 10/1998 | Cleveland | | |
| 5,915,808 A | 6/1999 | Stringari | | |
| 5,964,041 A * | 10/1999 | Daniel | | 33/403 |
| 6,062,122 A * | 5/2000 | Niemczyk | | 83/745 |
| 6,079,309 A | 6/2000 | Molburg | | |
| 6,158,930 A * | 12/2000 | Etter | | 409/180 |
| 6,176,281 B1 * | 1/2001 | Newman | | 144/144.51 |
| 6,256,899 B1 * | 7/2001 | McGhee | | 33/640 |
| 6,334,259 B1 * | 1/2002 | Harvey | | 33/42 |
| 6,401,343 B1 * | 6/2002 | Hsu | | 30/293 |
| 6,439,280 B1 * | 8/2002 | Wang | | 144/287 |
| 6,484,614 B1 * | 11/2002 | Huang | | 83/438 |
| 6,508,281 B1 * | 1/2003 | Wang | | 144/287 |
| 6,536,125 B2 * | 3/2003 | Klapperich | | 33/471 |
| 6,591,509 B2 * | 7/2003 | LeBlanc | | 30/374 |
| 6,757,981 B2 * | 7/2004 | Hampton | | 30/372 |
| 6,763,754 B1 * | 7/2004 | Glenn | | 83/745 |
| 6,776,076 B2 * | 8/2004 | Salazar | | 83/435.14 |
| 2009/0071312 A1 * | 3/2009 | Edmonds | | 83/829 |

* cited by examiner

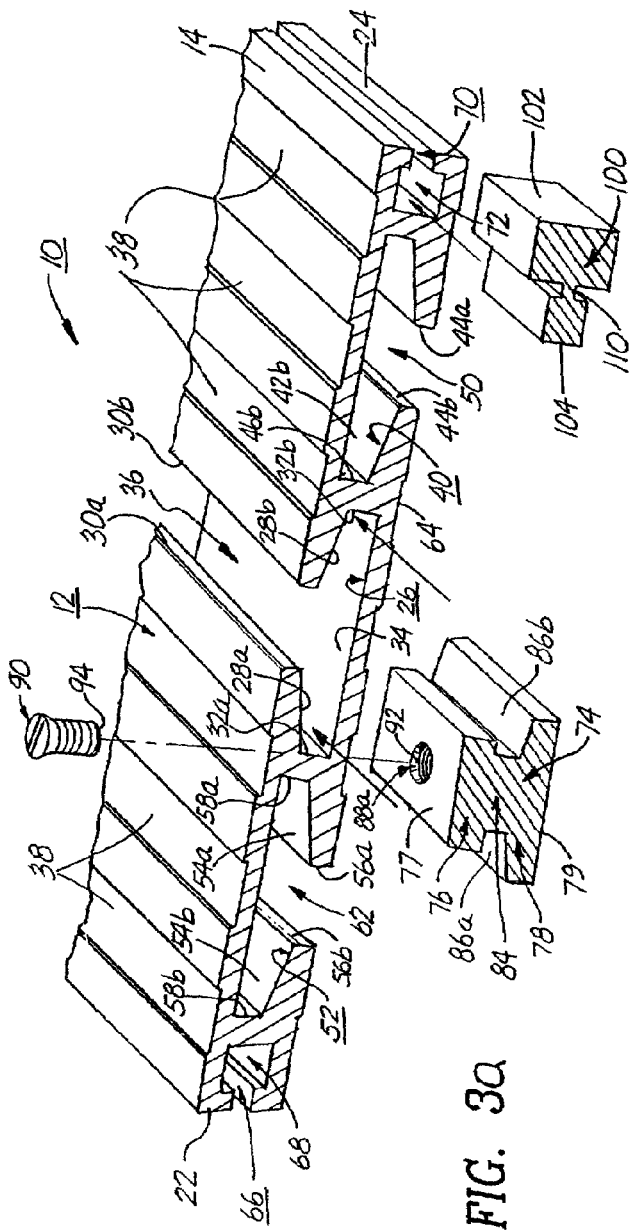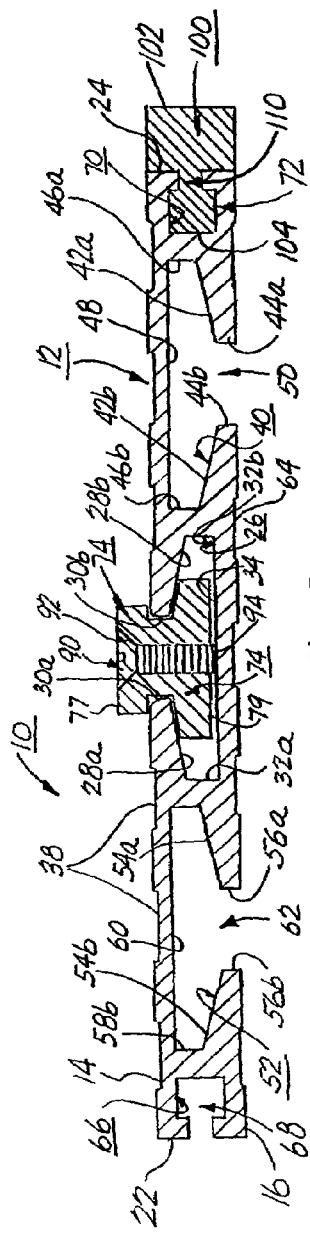
FIG. 3a
FIG. 3b

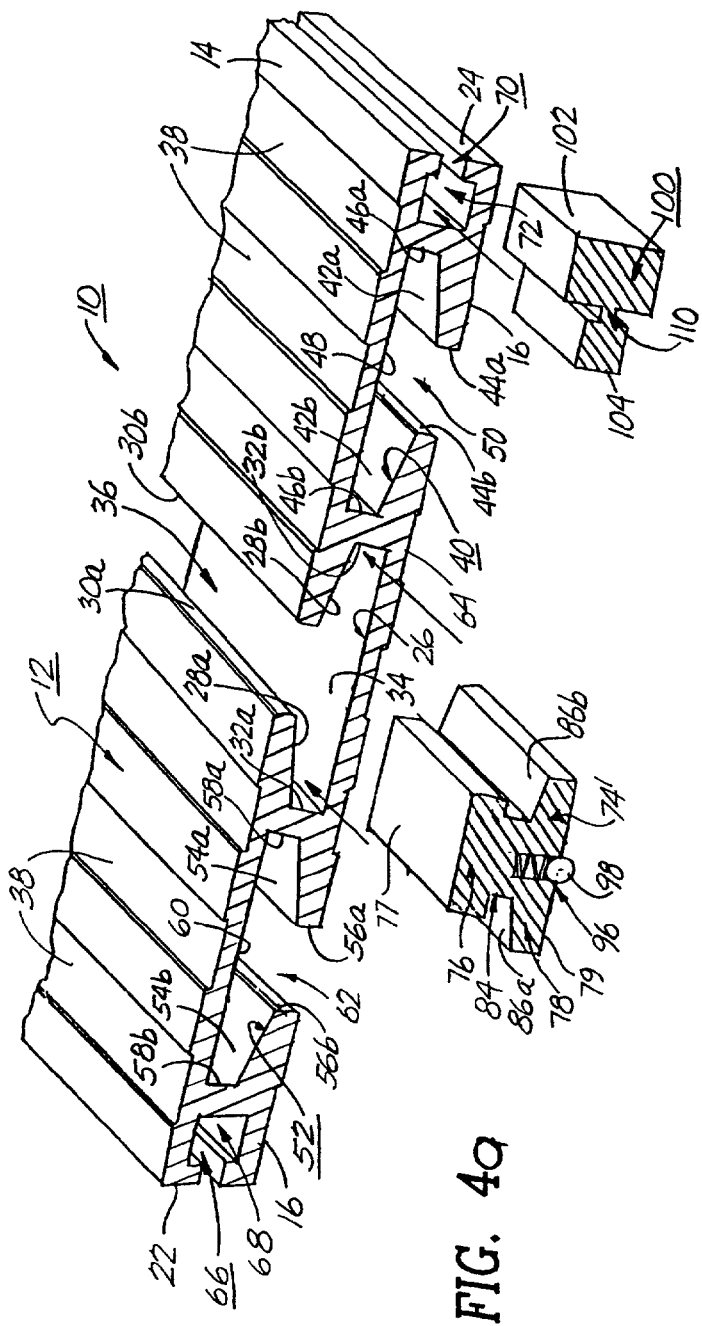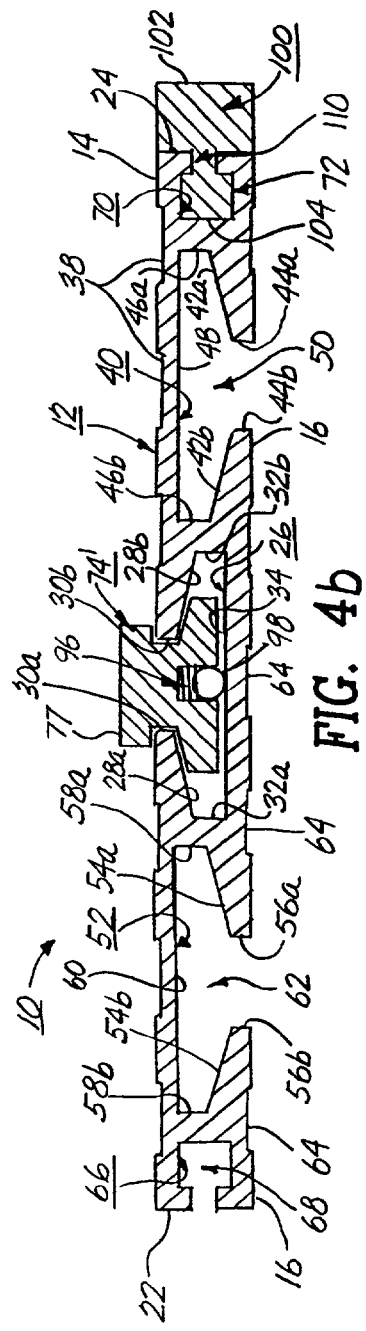

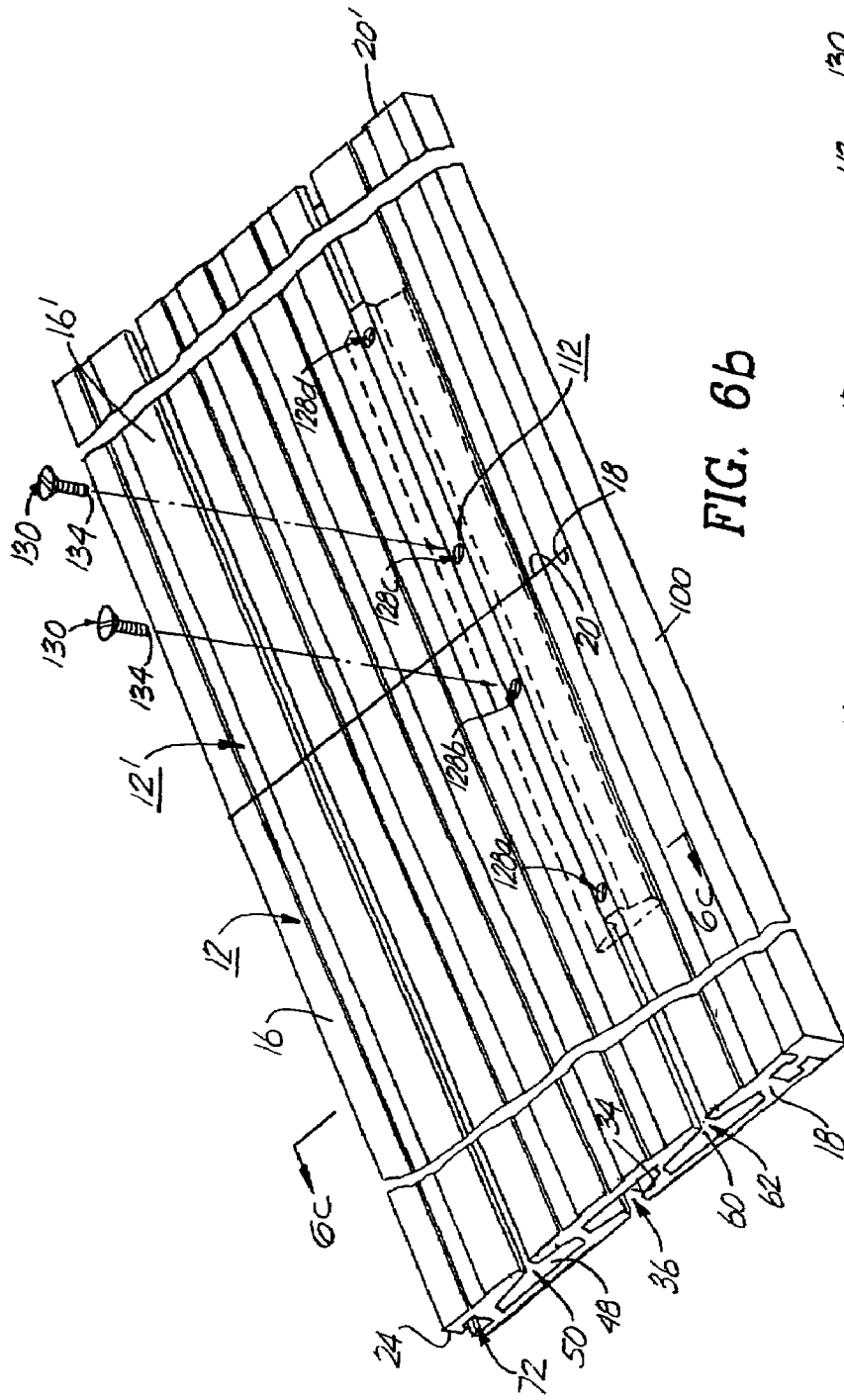
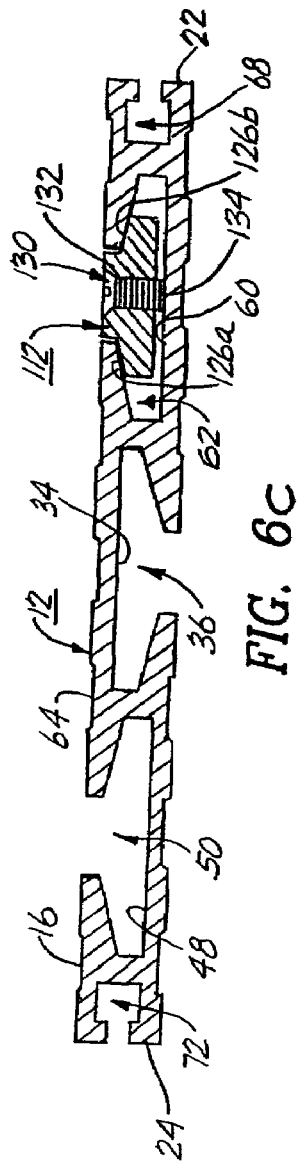
FIG. 6b
FIG. 6c

MULTI-FUNCTION WOODWORKING GUIDE

FIELD OF THE INVENTION

This invention relates to multi-functional woodworking tools and more particularly to handheld power tools.

BACKGROUND OF THE INVENTION

Guides for portable, handheld power tools, such as routers, jig saws and circular saws are well known in the prior art. The use of power tool guides are essential to the accurate grooving, cutting and drilling of materials, such as plywood, plaster board, particle board and composite board and the like. Portable handheld power tools cannot normally be used for precision cabinetry, carpentry or wood working because of their design limitations. For example, circular saws are capable of making many types of cuts in many types of materials are difficult to use to make a straight and accurate cut without the use of a guide.

Typical power tool guides have significant shortcomings and limitations in their operation. Separate types of power tool guides are required for different power tools, such as a circular saw, jig saw, router, planer, sander, etc. Power tool guides are not easily extendable, with their range limited to their size. Power tool guides are typically large in size (i.e. width), and unwieldy, making them hard to transport. Most power tool guides require an off-set measurement and an off-set measurement device simply to produce an accurate cut line, making the device labor intensive, and inaccurate.

There are many types of power tool guides. A portable guide, for use with a circular saw or router to assist in making straight cuts or grooves within panels or sheets by moving the power tool along a straight edged guide bar, is described in U.S. Pat. No. 6,079,309 issued to Molburg. Clamp assemblies secure the portable guide to the material and support the material by clamping on both sides of the cut line. Power tool guides that support a circular saw on a guide bar or extension, such that the saw rests on a surface of the guide bar during the cutting rather than on the material are disclosed in U.S. Pat. Nos. 3,869,951; 3,983,776; 4,050,340; 4,660,450; 5,427,006; and 5,472,029. The circular saw is cradled and held in a channel between tracking-type members to prevent lateral movement. Power tool guides that use a rigid frame member which mount to a bench or worktable are disclosed in U.S. Pat. Nos. 4,016,649; 4,945,799 and 4,995,285. The rigid frame has a plate to attach the circular saw to. The attached saw then slides along a cut line. Another power tool guide for a circular saw is disclosed in U.S. Pat. No. 4,065,114 issued to Pennington. The power tool guide has a tracking guide bar and an integral clamp secured to the guide bar for aligning the guide bar to the work piece.

Therefore, there is a need for a power tool guide which functions with a variety of handheld power tools, is extendable in length of material, does not require complex offset measurements and is easily transported.

SUMMARY OF THE INVENTION

The present invention is a multi-functional woodworking guide adapted for guiding interchangeable handheld power tools. One aspect of the present invention is that it is modular and easily extendable in length. Another aspect of the present invention is that the cut line can be set without the necessity of the need for offset measurements.

BRIEF DESCRIPTION OF THE DRAWINGS

A more complete understanding of the present invention may be obtained from consideration of the following description with the drawings in which:

FIG. 3a is a cross-sectional perspective view of the universal guide assembly of FIG. 1 taken along section line 3a-3a, showing the insertion of a slide bar within a tracking channel of the guide plate;

FIG. 3b is a cross-sectional view of the guide plate of FIG. 3a, showing the alignment of the slide bar with the tracking channel positioned by a setscrew;

FIG. 4a is a cross-sectional perspective view of the universal guide assembly of FIG. 1 taken along section line 4a-4a, showing the insertion of an alternate slide bar within the tracking channel of the guide plate;

FIG. 4b is a cross-sectional view of the guide plate of FIG. 4a, showing the alignment of the alternate slide bar within the tracking channel positioned by a spring-loaded ball member;

FIG. 6b is a perspective view of the connecting spline within the assembled pair of guide plates of FIG. 6a;

FIG. 6c is a cross-sectional view of the assembled pair of guide plates utilizing the connecting spline of FIG. 6b taken along section line 6c-6c;

FIG. 16a is an exploded perspective view of the router attachment assembly of FIG. 15a;

FIG. 21b is a bottom perspective view of the saw attachment assembly of FIG. 21a;

FIG. 22 is an exploded perspective view of the saw attachment assembly of FIG. 21a;

DETAILED DESCRIPTION OF VARIOUS ILLUSTRATIVE EMBODIMENTS

Figure 1:
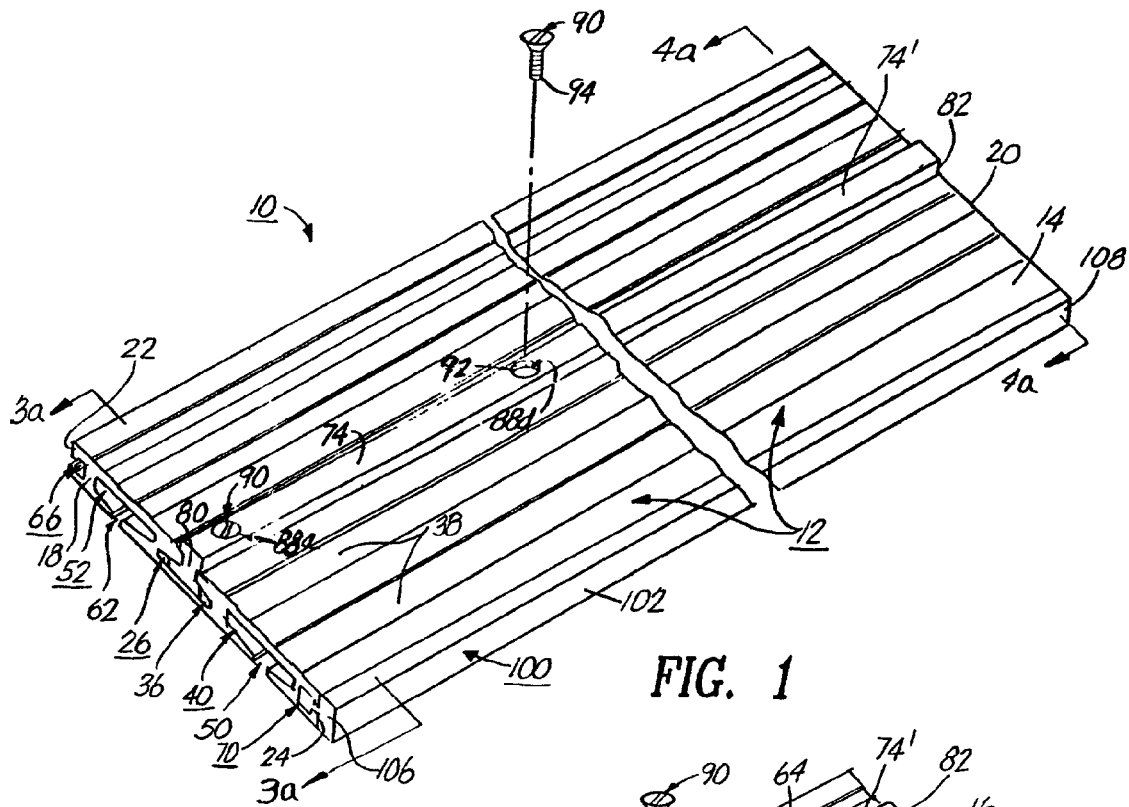
FIG. 1 is a perspective view of a universal guide assembly with a first working surface configuration of a guide plate.
Figure 2:
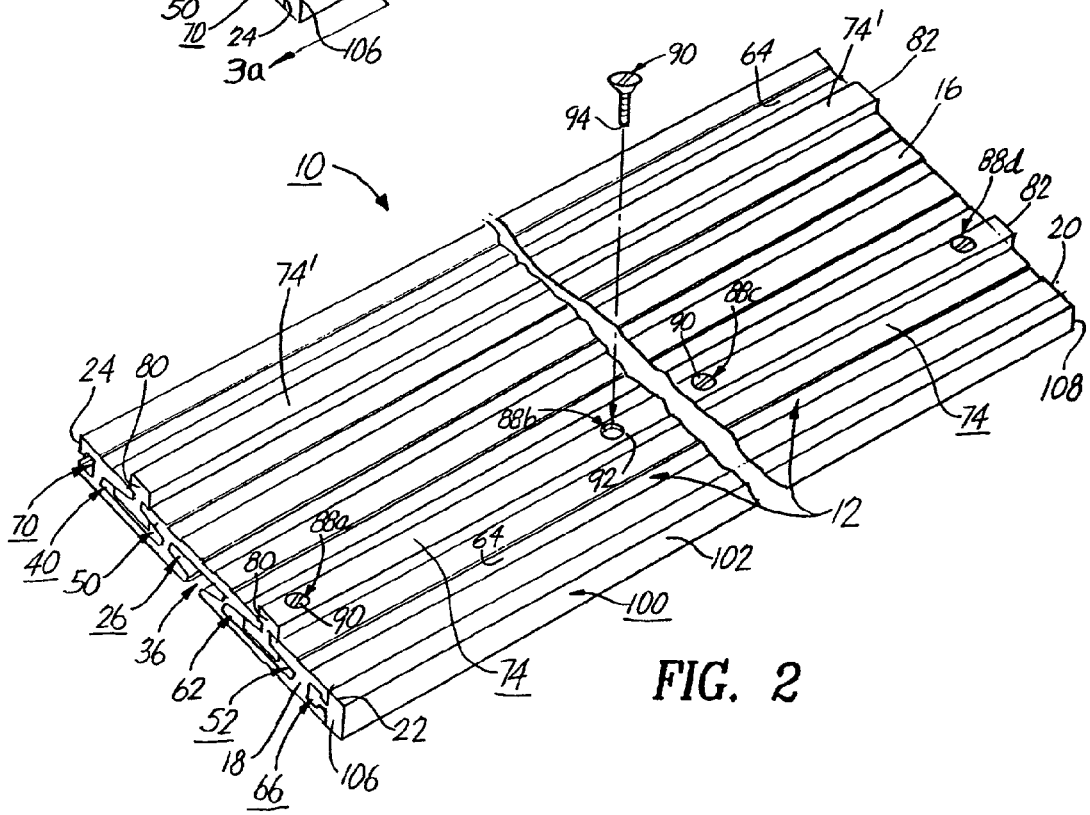
FIG. 2 is a perspective view of the universal guide assembly of FIG. 1, with a second working surface configuration of the guide plate.

The present invention is a multi-functional woodworking system for guiding interchangeable handheld power tools. One aspect of the present invention is that it is modular and easily extendable in length. Another aspect of the present invention is that the cut line can be set without the necessity of the need for offset measurements.

The multi-functional woodworking system is a portable universal guide assembly for multiple hand held power tools that is extendable with the use of multiple guide plates, side bars and edge bars in order to increase the size of the guide device to any length, thus being capable of cutting, grooving or sanding an unlimited length of material with the use of side extension clamps. The multi-functional woodworking system is compact, portable and easy to transport, as it fits into the back seat or trunk of a car. The multi-functional woodworking system is not easily damaged when dropped or when in use, because of the side edge bars prevent any denting of the side edges of the guide plate.

The multi-functional woodworking system is easy to secure to a work piece (material) by using various integrated clamps (such as side extension clamps and slide under clamps) which do not have to be move when cutting, grooving or sanding the material, wherein the clamps are position relative to the guide plates as not to interfere with any movement of the power tools in the cutting, grooving or sanding of the material.

The multi-functional woodworking system allows for bi-directional of the power tool in either longitudinal direction.

The multi-functional woodworking system includes an integrated measurement system for repeatable and accurate cutting, grooving and drilling with a power tool without using a tape measure or marking the surface of the material.

The multi-functional woodworking system allows accurate and easy positioning to the material (work piece), wherein the cutting line (on the work piece) is at the outer side edge of the guide plate(s). Thus eliminating the need for any off-set measurements or add-on elements for measurements or the time consuming labor required for doing such measurements.

The multi-functional woodworking system is versatile, such that the guide tracking channels can be in a center position or in off-center positions in order to make it easier to connect to multiple power tools without the need for large extension arms. The multi-functional woodworking system allows for the guide plate(s) to function using either of its working surfaces and its edge tracking channels for multiple power tools, such as circular saws, jig saws, routers, belt sanders and planers, as well as other tools, such as a cut-off saw, a grinder, a drill, a sliding square, a sliding level, a tile layout guide and the like.

Referring to FIGS. 1-7b, there is shown a perspective view of an exemplary embodiment of the present invention, multi-functional woodworking system expandable universal guide assembly 10 for use with handheld electrical power tools (e.g., such as circular saws, routers, planers, belt sanders, reciprocating saws, and other hand held tools as well) for cutting all types of materials. As shown in FIGS. 1 to 3d, the multi-functional woodworking system 10 includes a guide plate 12 made from extruded aluminum, plastic, composite or other suitable materials. In one embodiment, the guide plate 12 is 6 inches in width, 48 inches in length and 0.5 inches in thickness. The guide plate 12 includes a first working surface area 14, a second working surface area 16, a front edge 18, a rear edge 20, a first perimeter side edge 22 and a second perimeter side edge 24. The first working surface area 14 of guide plate 12 includes a centrally positioned first T-shaped track 26 extending from the front edge 18 to the rear edge 20, along the longitudinal length of guide plate 12. The T-shaped track 26 includes a pair of chamfered/beveled wall surfaces 28a, 28b, a plurality of vertically aligned, interior sidewall surfaces 30a, 30b, 32a and 32b, and an interior base wall surface 34 for forming an interior T-shaped tracking channel 36. The first working surface area 14 of guide plate 12 also includes relief elements 38 for the deposit of sawdust, metal filings and the like, in order to not create friction with regard to the guide plate 12.

Referring again to FIGS. 1 to 3d, the second working surface area 16 includes a second T-shaped track 40 being positioned and adjacent to the first perimeter side edge 22 and is extending from the front edge 18 to the rear edge 20, along the longitudinal length of guide plate 12. The substantially second T-shaped track 40 includes a pair of chamfered/beveled wall surfaces 42a, 42b, a plurality of vertically aligned, interior sidewall surfaces 44a, 44b, 46a and 46b, and an interior base wall surface 48 for forming an interior T-shaped tracking channel 50. The second working surface area 16 also includes a third T-shaped track 52 being positioned and adjacent to the second perimeter side edge 24 and is extending from the front edge 18 to the rear edge 20, along the longitudinal length of guide plate 12. The third T-shaped track 52 also includes a pair of chamfered/beveled wall surfaces 54a, 54b, vertically aligned, interior sidewall surfaces 56a, 56b, 58a and 58b, and an interior base wall surface 60 for forming an interior T-shaped tracking channel 62. The second working surface area 16 further includes relief elements 64 for the collection of sawdust, metal filings and the like.

With reference to FIGS. 1 to 3d, the first perimeter side edge 22 includes a centrally positioned first sidetrack 66 extending from the front edge 18 to the rear edge 20, along the longitudinal length of guide plate 12. The first sidetrack 66 includes an interior square-shaped tracking channel 68. The second perimeter edge side 24 also includes a centrally positioned second sidetrack 70 extending from the front edge 18 to the rear edge 20, along the longitudinal length of guide plate 12. The second sidetrack 70 also includes an interior square-shaped tracking channel 72.

Referring now to FIGS. 1, 2, 3a to 3d, the tracking channels 36, 50 and 62 for tracks 26, 40 and 52, respectively, are used for receiving one or more substantially I-shaped slide bars 74 therethrough. Slide bars 74 are made of extruded aluminum or other composite materials and have lengths of 24 inches or 48 inches. Each slide bar 74 includes an upper wall 76 having an upper surface 77, a lower base wall 78 having a lower surface 79, opposing end surfaces 80 and 82 and an integrally connected column 84 between the upper and lower walls 76 and 78. The column 84 includes opposing chamfered/beveled wall surfaces 86a, 86b integrally attached thereto. Each slide bar 74 includes two or more setscrew openings 88a, 88b, 88c or 88d (depending upon the length of slide bar 74) for receiving a setscrew 90. Each setscrew opening 88a, 88b, 88c and 88d includes a counter-sink groove 92. Each of the setscrew openings 88a to 88d extend from the upper surface 77 to the lower base surface 79. Each of the setscrews 90 are of sufficient length, such that each end tip 94 of the setscrew 90 is set off from the interior base wall surfaces 34, 48 or 60 of tracking channels 36, 50 or 62, respectively, as depicted in FIG. 3b. The slide bar(s) 74 self-aligned within any one of the tracking channels 36, 50 or 62, wherein the slide bar(s) 74 interact with the handheld power tools.

Referring to FIGS. 3c and 3d, the slide bar 74' has an alternate self-alignment mechanism, each of the slide bars 74' include a spring-loaded ball member 96 having an end contact point 98, with the spring-loaded ball member 96 being located on the lower base wall surface 78'. Two or more of the spring-loaded ball members 96 are spaced apart (depending upon the length of slide bar 74') along the 24 inch or 48 inch length of slide bar 74'. Each of the spring-loaded ball members 96 are of a sufficient spring force, such that each end contact point 98 of the spring-loaded ball member is set off from the interior base wall surfaces 34, 48 or 60 of tracking channels 36, 50 or 62, respectively, as depicted in FIG. 3d. Thus, the slide bar(s) 74' also become self-aligned within any one of the tracking channels 36, 50 or 62, wherein the slide bar(s) 74' will interact with the handheld power tools.

Referring to FIGS. 1 to 3d once again, the square-shaped tracking channels 68 and 72 for tracks 66 and 70, respectively, are used for receiving one or more substantially I-shaped positioning edge bar(s) 100 therethrough. The positioning edge bars 100 are made of wood, plastic or other suitable materials and have lengths of 24 inches or 48 inches. Each edge bar 100 includes an outer wall 102, an inner wall 104, opposing end wall surfaces 106, 108, and an integrally connected column 110 between the outer and inner walls 102 and 104. The edge bar 100 is used for the positioning extension and protection of the guide plate 12. By using the edge bar 100, the positioning line and cutting line are the same, thus eliminating the offset measurements. Another use for tracking channels 68, 72 is to receive an optional side clamp assembly.

Figures 5A, 5B, 5C:
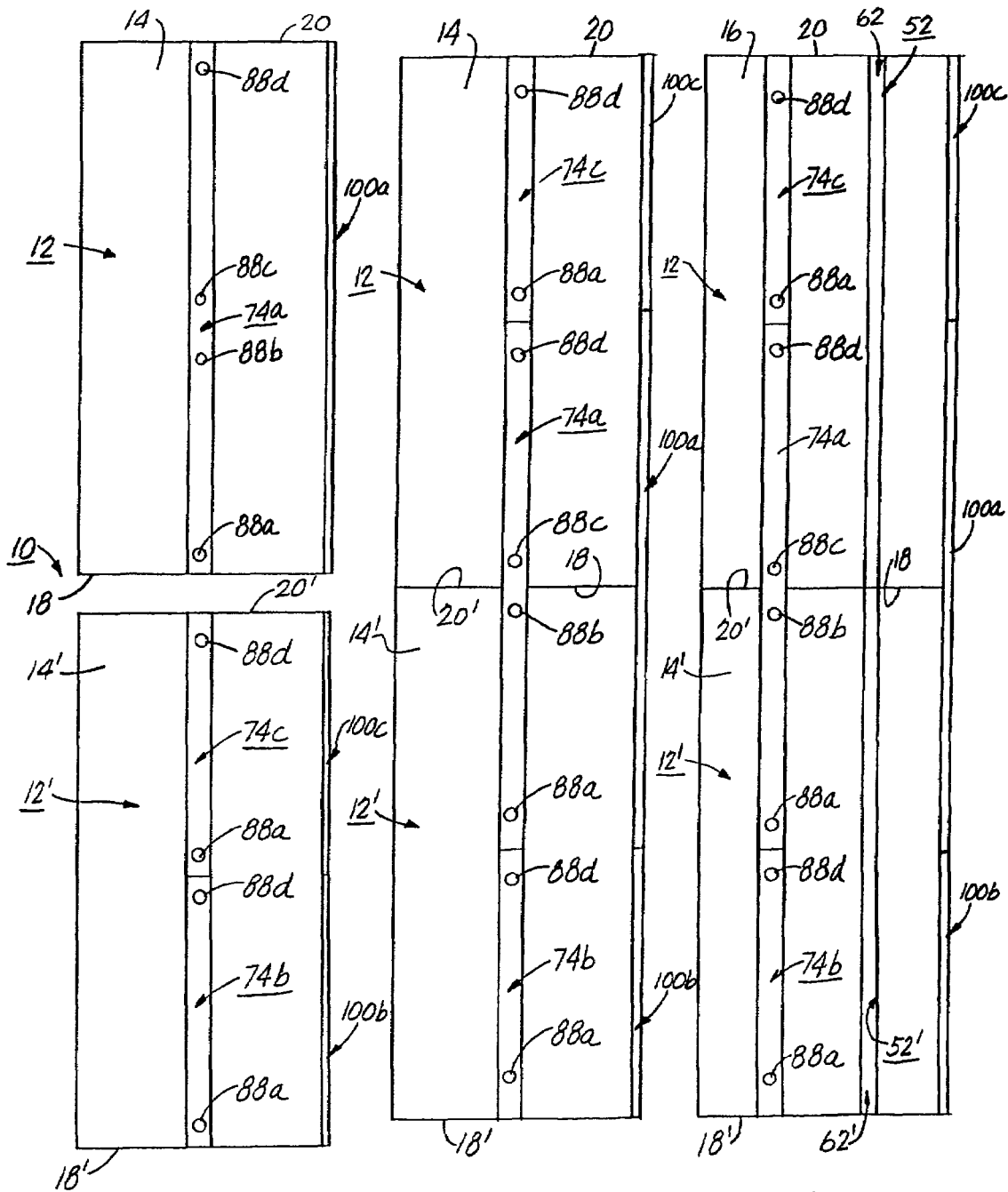
FIG. 5a is a top view of a pair of guide plate of FIG. 1 being readied for assembly.
FIG. 5b is a top view of the two guide plates of FIG. 1 being joined and connected by slide bars within the adjoining tracking channels of each of the first working surface configurations of each guide plate.
FIG. 5c is a top view of the two guide plates of FIG. 2 being joined and connected by slide bars within one of the adjoining tracking channels of each of the second working surface configurations of each guide plate.

FIGS. 5a, 5b and 5c show the steps for connecting two guide plates 12 and 12' together, using multiple slide bars 74a, 74b and 74c of various lengths (1-48 inch slide bar 74a and 2-24 inch slide bars 74b and 74c), as well as using multiple positioning edge bars 100a, 100b and 100c (1-48 inch edge bar 100a and 2-24 inch edge bars 100b and 100c)(see FIG. 5a).

FIG. 5b shows the expandability and the connecting of guide plates 12 and 12' together using slide bars 74b, 74a and 74c within the center tracking channel 36 on the working surfaces 14 and 14' of guide plates 12 and 12', respectively. Each of the slide bars 74b, 74a and 74c are held in position by setscrews 90 within screw openings 88a, 88b, 88c and 88d accordingly.

FIG. 5c shows the expandability and the connecting of guide plates 12 and 12' together using slide bars 74b, 74a and 74c within one of non-centered tracking channels 50 or 62 on the working surface 16 and 16' of guide plates 12 and 12', respectively. Each of the slide bars 74b, 74a and 74c are also held in position by setscrews 90 within screw openings 88a, 88b, 88c and 88d accordingly.

Figure 6A:
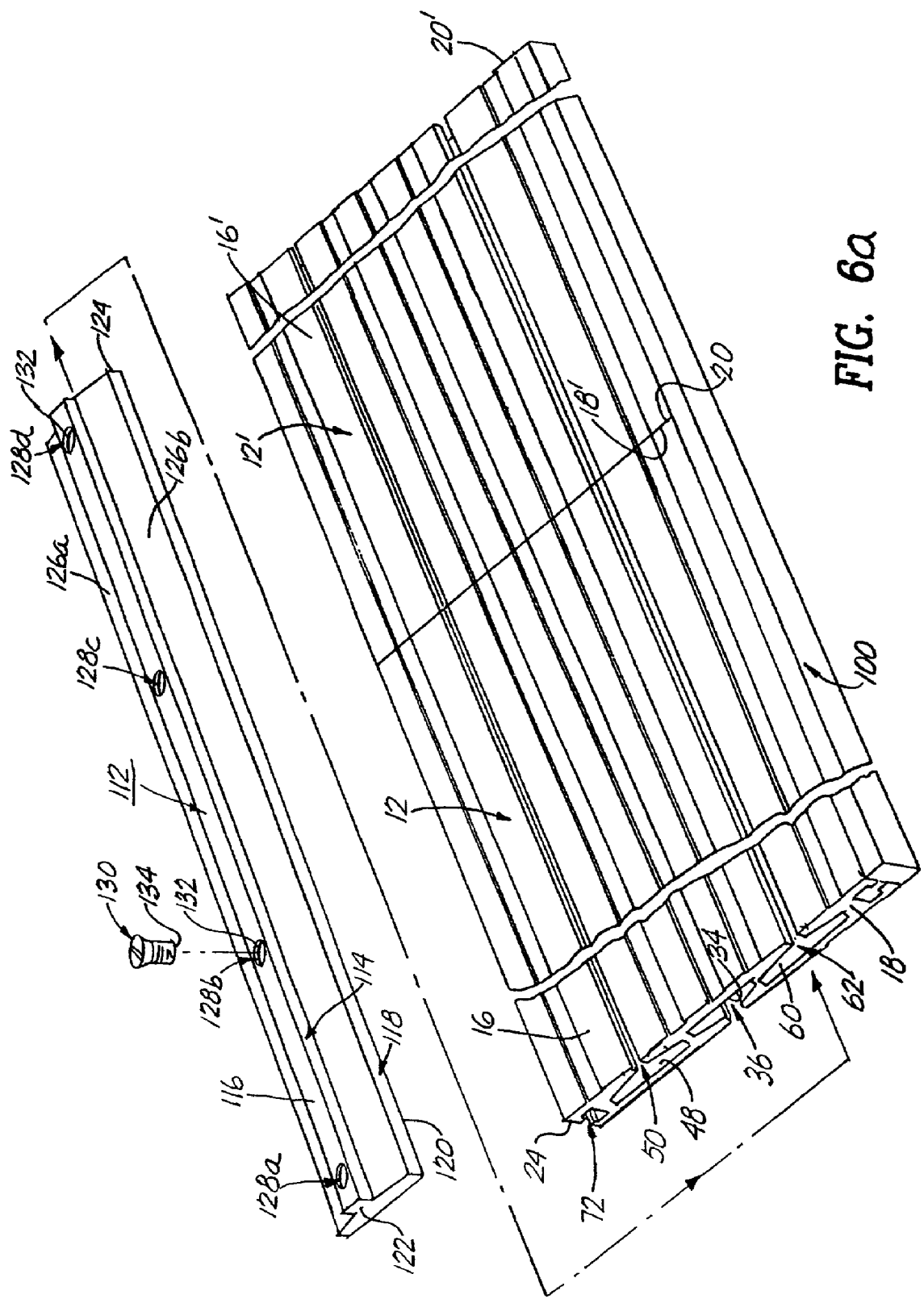
FIG. 6a is a perspective view of a connecting spline utilized in the assembly of the two guide plates of FIG. 5b.

Referring now to FIGS. 6a, 6b and 6c, there is shown an optional, self-aligned connecting spline member 112 for connecting two guide plates 12 and 12' together in which to prevent any lateral flexing or movement of the two assembled guide plates 12 and 12' (see FIG. 6b). The connecting spline member 112 is received within one of the paired tracking channels 36, 36' or 50, 50' or 62, 62', such that a portion of the inverted T-shaped spline member 112 is within each tracking channel 36, 36' or 50, 50' or 62, 62'. The connecting spline member 112 is always attached to the opposing working side 14 or 16 of where the slide bars 74 and 74' are being used. The connecting spline member 112 is made of steel, aluminum or other composite materials and has a length of 12 inches. The spline member 112 includes an upper wall 114 having an upper surface 116, a lower base wall 118 having a lower base surface 120, and opposing end surfaces 122 and 124. The lower base wall 118 includes opposing chamfered/beveled wall surfaces 126a and 126b for self-centering action thereto (see FIG. 6a). The connecting spline member 112 includes a plurality of setscrew openings 128a, 128b, 128c and 128d for receiving a setscrew 130 therein. Each setscrew opening 128a to 128d includes a counter-sink groove 132 therein. Each of the setscrew openings 128a to 128d extend from the upper surface 116 to the lower base surface 120. Each of the setscrews 130 are of sufficient length, such that each end tip 134 of setscrew 130 is set off from the interior base wall surfaces 34, 48 or 60 of tracking channels 36, 50 or 62, respectively, as shown in FIG. 6c. The connecting spline member 112 becomes self-aligned and a rigid support within any one of the tracking channels 36, 36' or 50, 50' or 62, 62' of guide plates 12, 12', respectively, in order to prevent the lateral flexing of the connected guide plates 12 and 12' (see FIG. 6*b*).

Figures 7A, 7B:
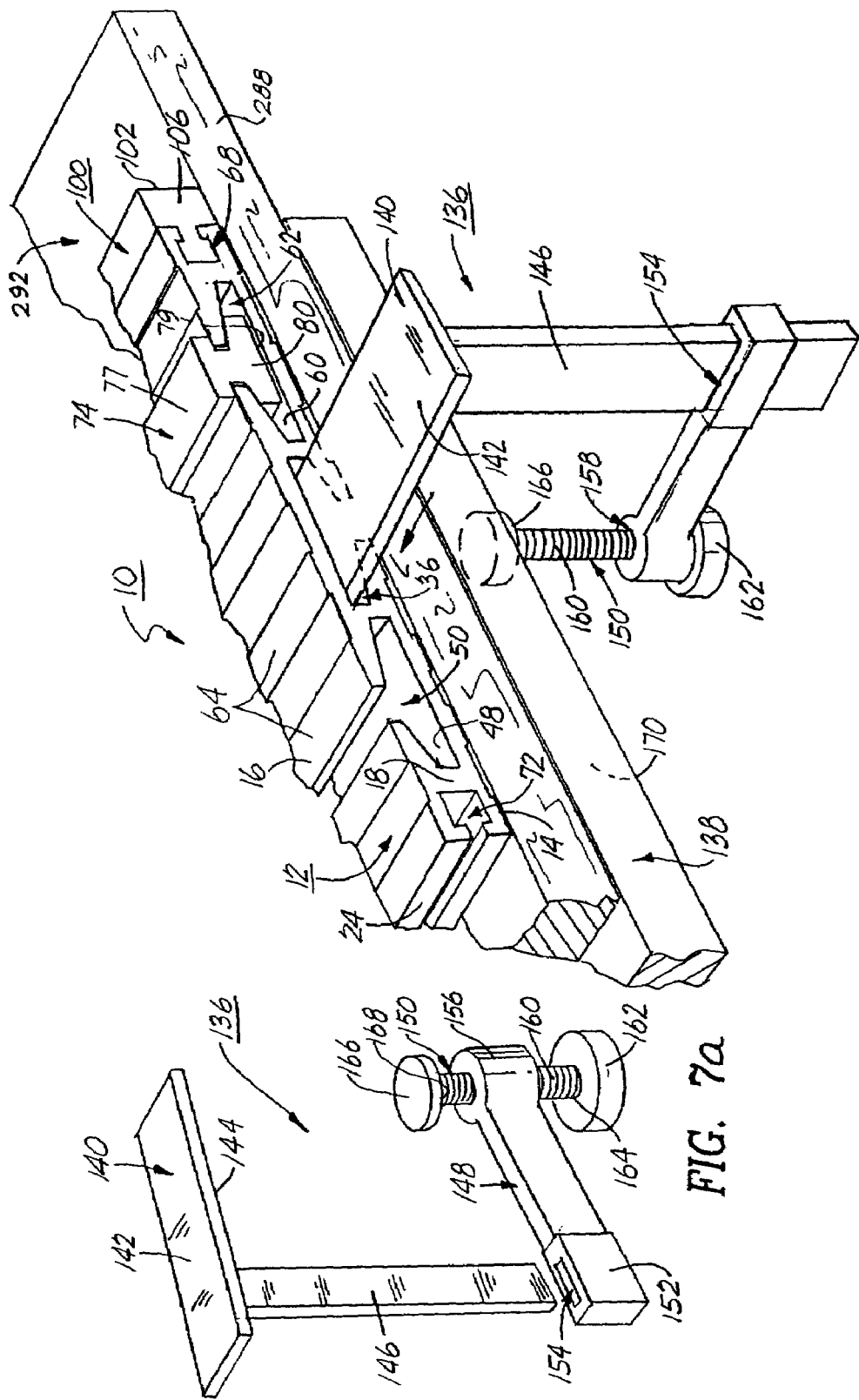
FIG. 7a is a perspective view of a quick release clamp utilized in the holding of the universal guide assembly of FIG. 1.
FIG. 7b is a perspective view of the quick release clamp of FIG. 7a inserted within the tracking channel of the guide plate of FIG. 1.

Referring to FIGS. 7*a* and 7*b*, there is shown a slide under clamp 136 for holding in position one or more guide plates 12, 12' to a work table 138. The clamp 136 includes a slide member 140 having an upper wall surface 142 and a lower wall surface 144, a height adjustment bar 146, a clamping bar 148, and a clamping post 150. The adjustment bar 142 is integrally connected to the lower wall surface 144 of slide member 140. The clamping bar 148 includes a first end 152 having a rectangular opening 154 for receiving the height adjustment bar 146 therein. The clamping bar 148 further includes a second end 156 having a circular opening 158 for receiving a threaded clamping adjustment rod 160 of the clamping post 150 therein. The clamping post 150 also includes an adjustment knob 162 at one end 164 and a clamping member 166 at the other end 168. In operation, the upper wall surface 142 of slide member 140 is in contact with the interior base wall surfaces 34, 48 or 60 of tracking channels 36, 50 or 62, respectively, depending upon which work surface 14 or 16 of guide plate 12 is not being used, as depicted in FIG. 7*b*. The clamping member 166 of clamping post 150 is in contact with an underside 170 of work table 138 which allows for the slide under clamp 136 to be positioned for holding the guide plate 12 in place.

Figure 9:
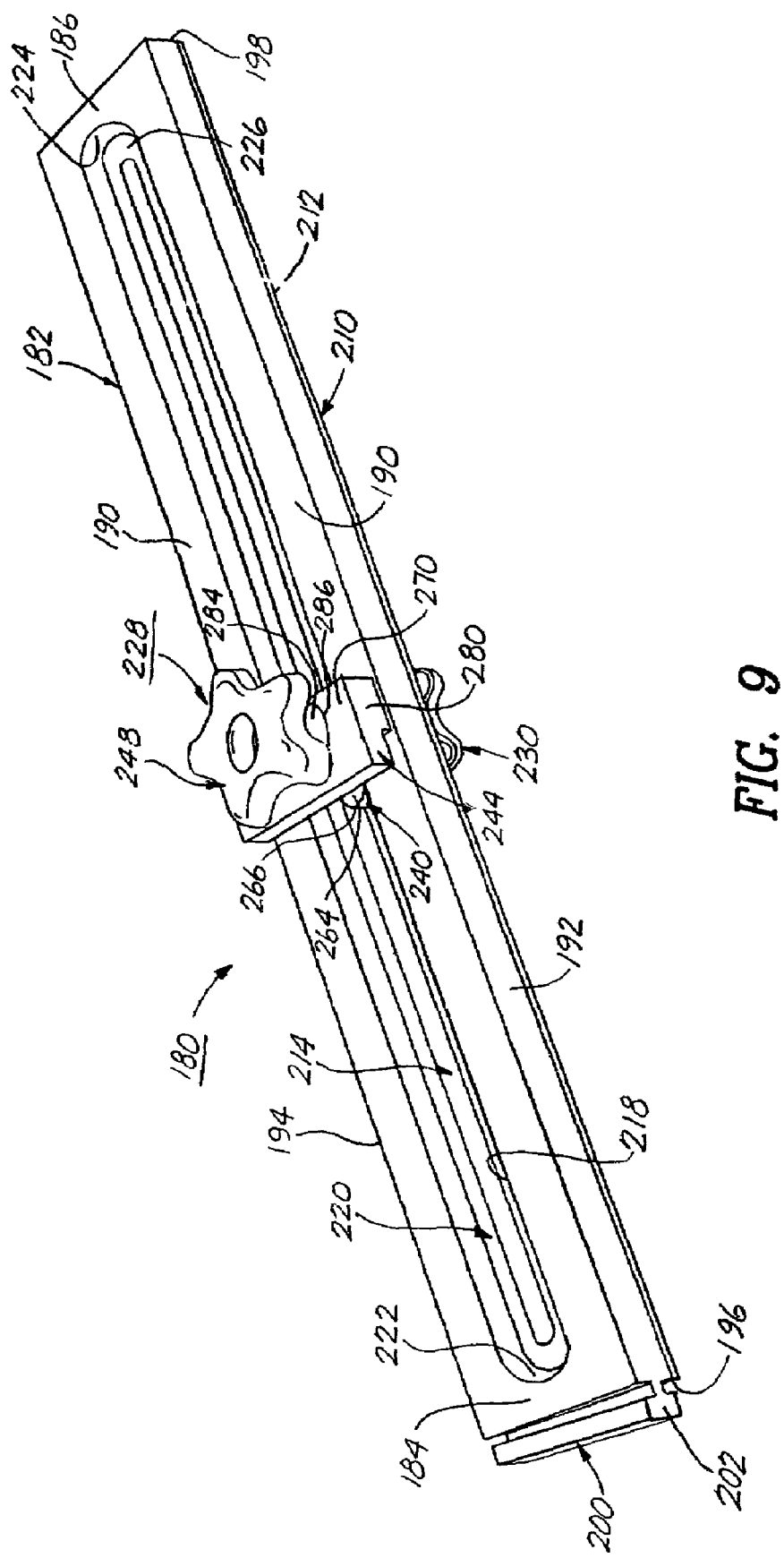
FIG. 9 is a bottom perspective view of the side clamp assembly of FIG. 8.
Figure 10:
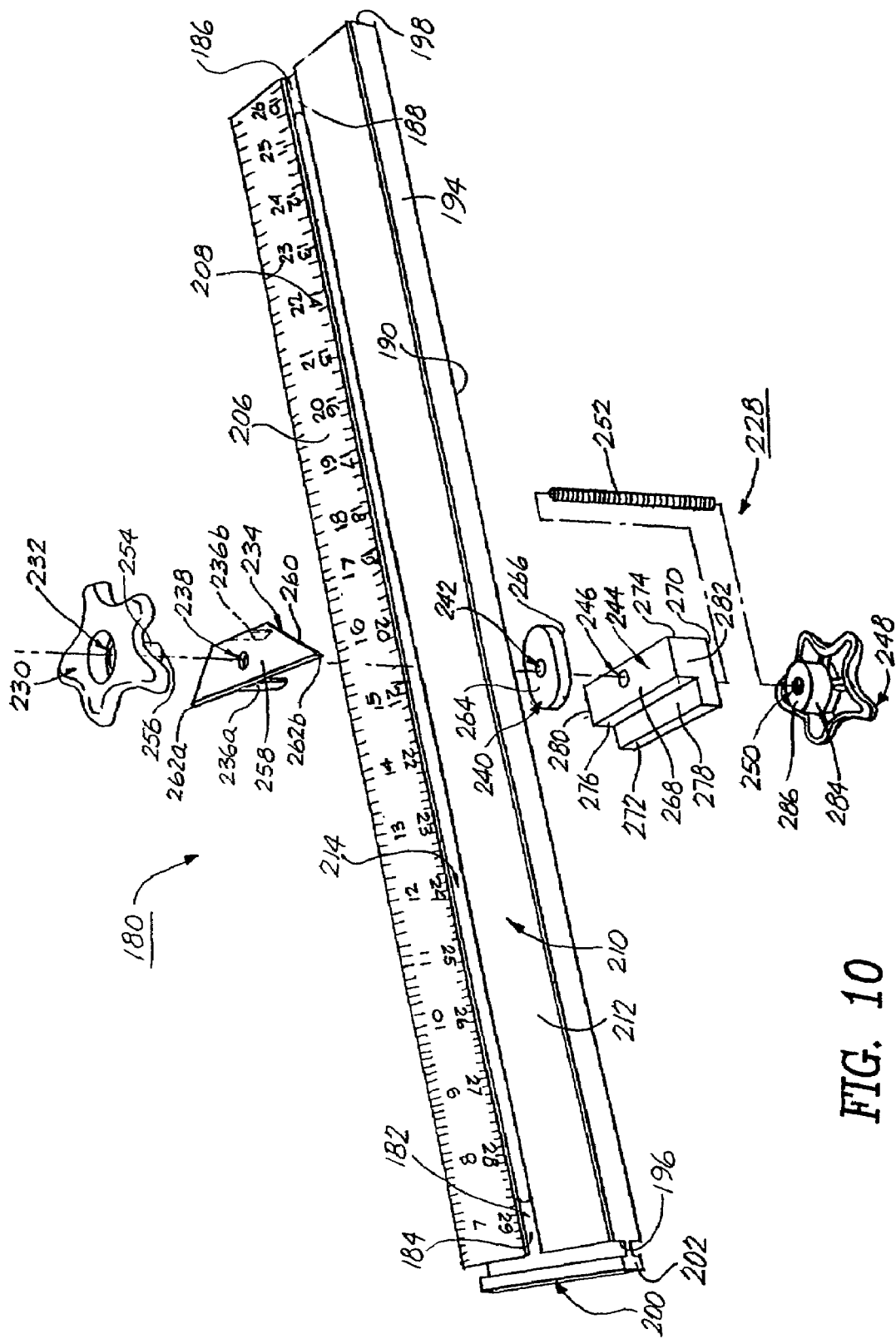
FIG. 10 is an exploded perspective view of the side clamp assembly of FIG. 1.
Figure 11:
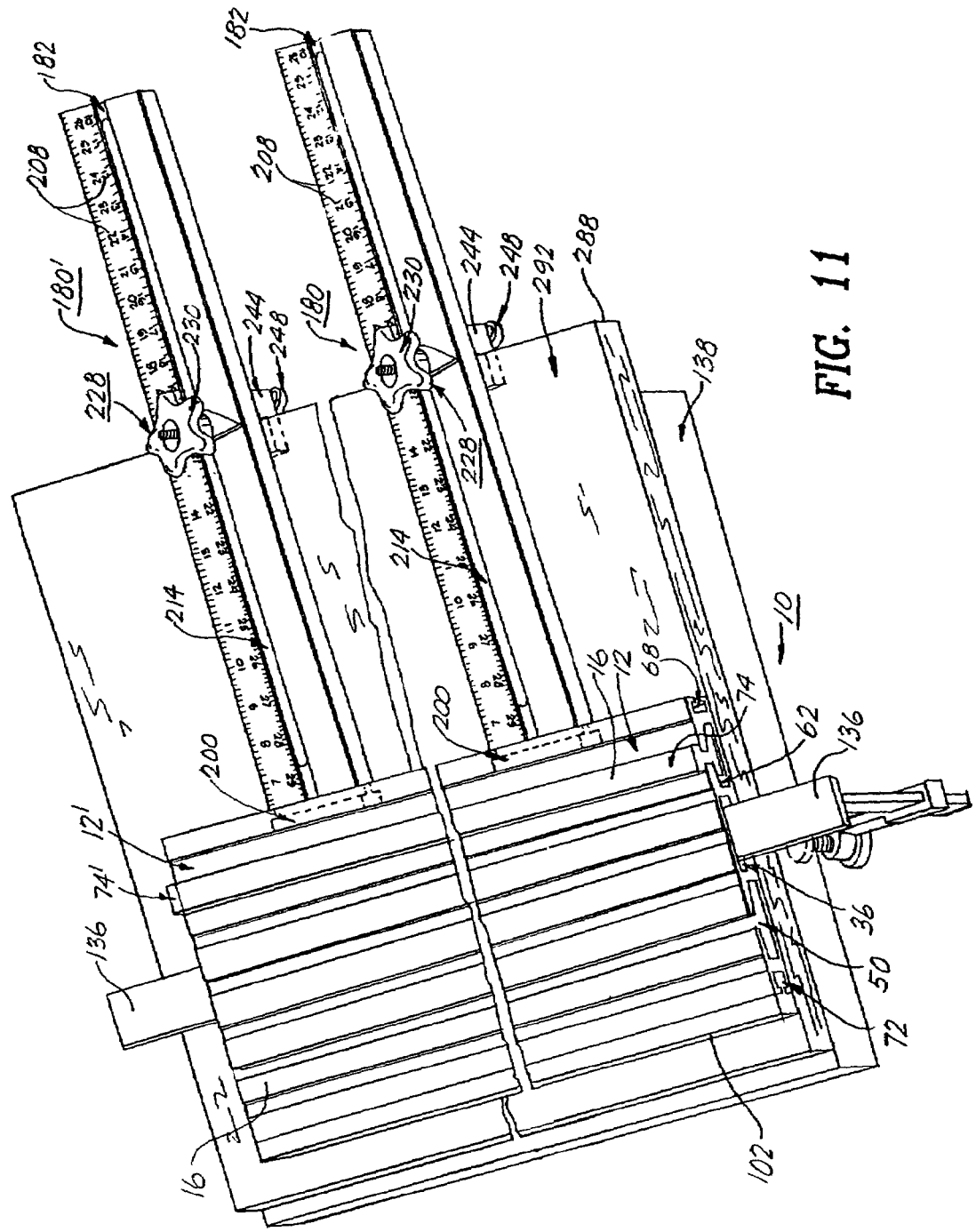
FIG. 11 is a perspective view of the side clamp assembly of FIG. 8 showing the attachment of the guide plate of FIG. 2.
Figure 12:
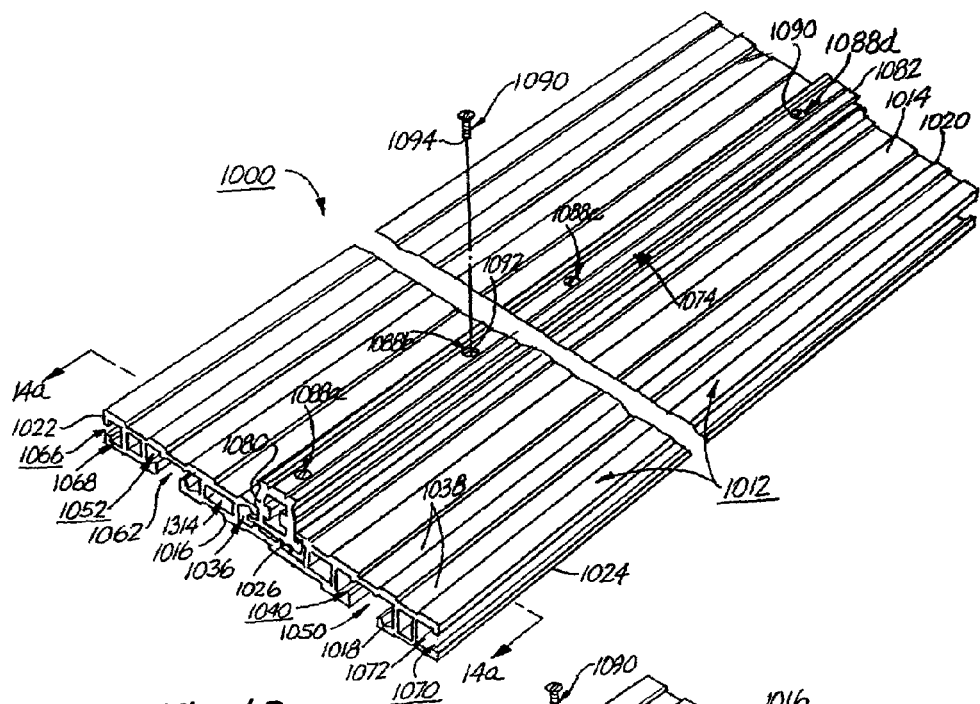
FIG. 12 is a perspective view of another exemplary embodiment of a universal guide assembly with a first working surface configuration of an alternate guide plate.
Figure 13:
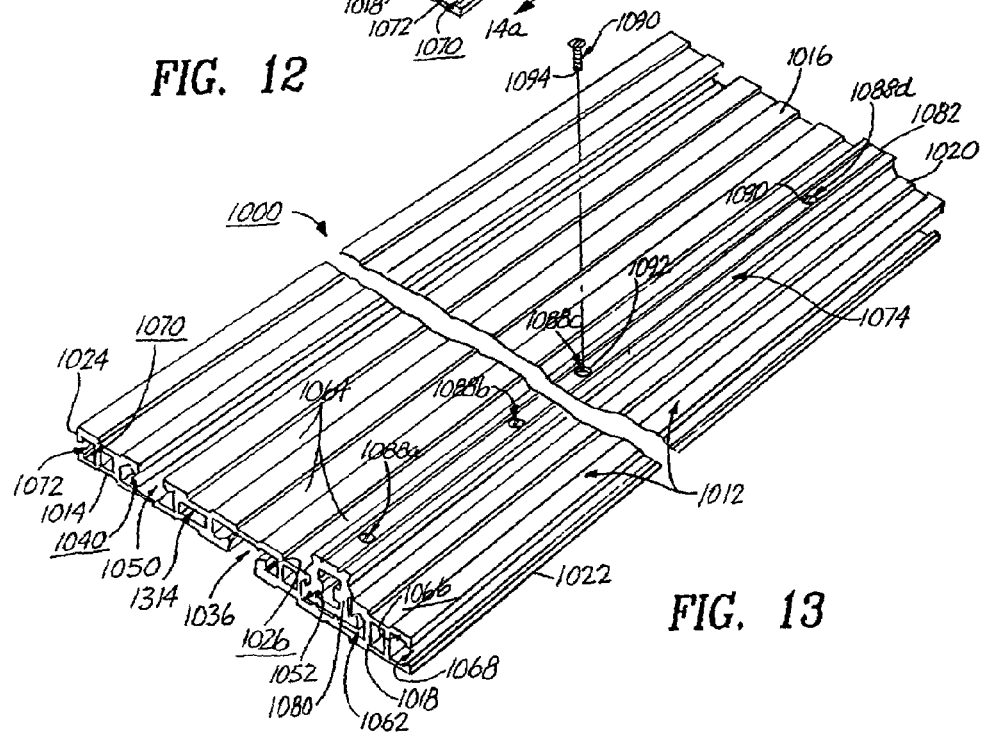
FIG. 13 is a perspective view of the universal guide assembly of FIG. 12, with a second working surface configuration of the alternate guide plate.
Figure 14A:
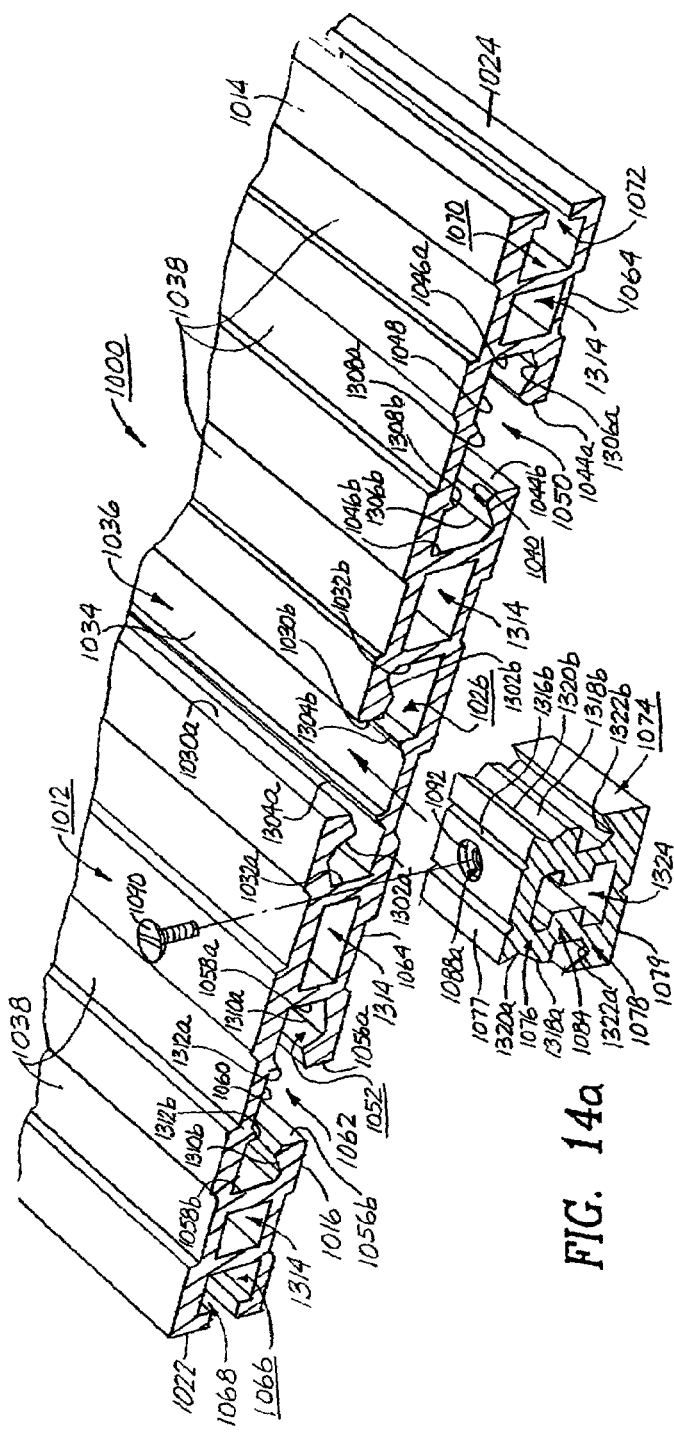
FIG. 14a is, a cross-sectional perspective view of the universal guide assembly of FIG. 12 taken along section line 14a-14a, showing the insertion of an alternate slide bar within a tracking channel of the alternate guide plate.
Figure 14B:
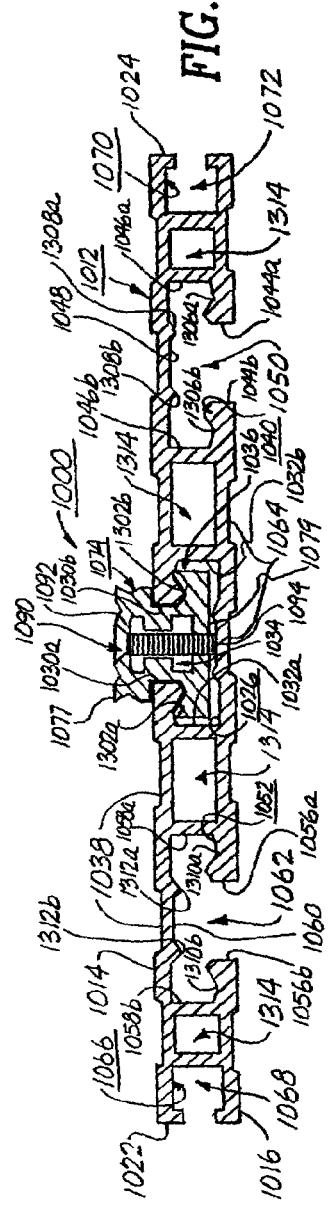
FIG. 14b is cross-sectional view of the alternate guide plate of FIG. 14b, showing the alignment of the alternate slide bar within the tracking channel being positioned by a setscrew.

Referring to FIGS. 8 to 11, there is shown an optional side extension clamp assembly 180 for use with one or more guide plates 12, 12' for repetitive cutting of the same width/length of the work material (e.g., plywood). In operation, at least two (2) side clamp assemblies 180, 180' would be used in conjunction with guide plates 12, 12', respectively, as depicted in FIG. 11. The side clamp assembly 180 includes a slide plate 182 having a proximal end 184 and a distal end 186. The slide plate 182 includes a top wall surface 188, a bottom wall surface 190, perimeter sides 192, 194, a proximal end wall surface 196 and a distal end wall surface 198. The proximal end wall surface 196 includes an integrally attached insertion member 200 having a substantially square-shaped tab insert 202 thereon. The tab insert 202 of insertion member 200 is received within one of the square-shaped tracking channels 68, 68' of 72, 72' of guide plates 12, 12'.

Figure 8:
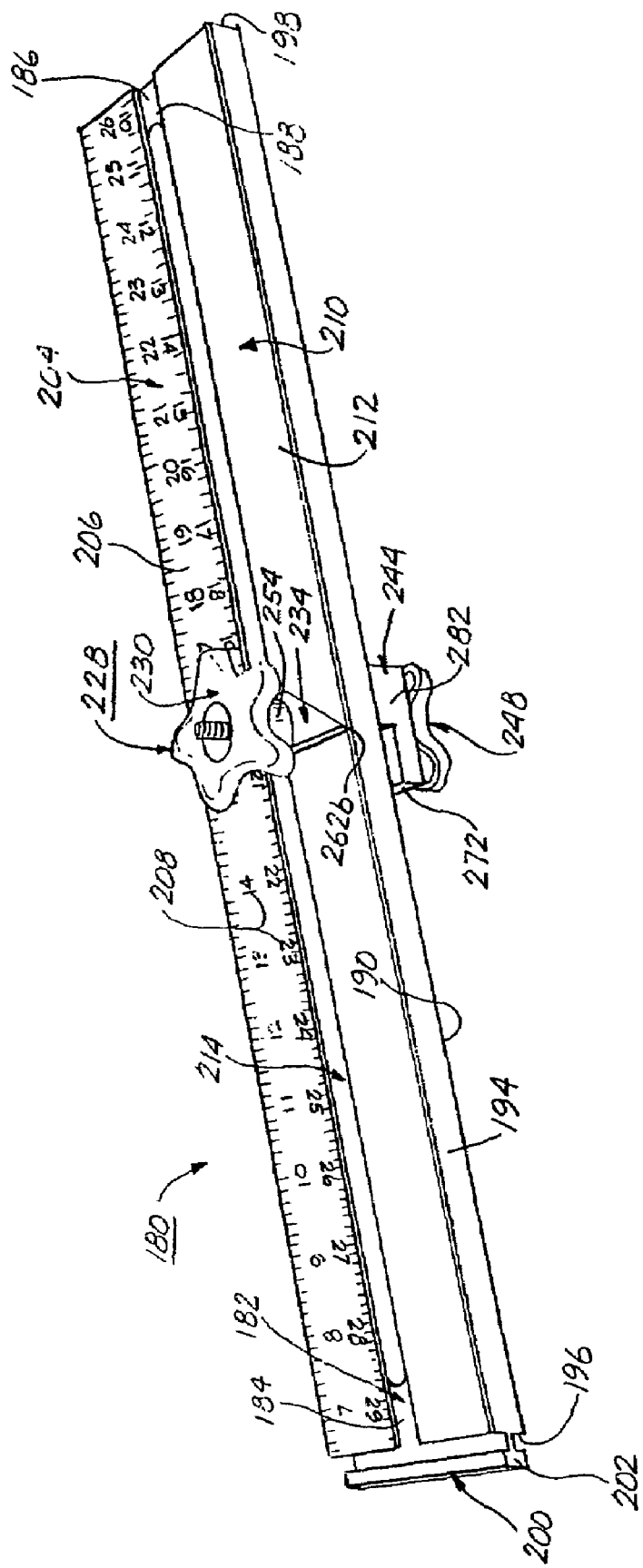
FIG. 8 is a perspective view of a side clamp assembly used with the universal guide assembly of FIG. 1.

Referring again to FIGS. 8 to 11, the top surface 188 includes a first thin, flat elongated metal strip 204 having a top wall surface 206 extending from the proximal end 184 to the distal end 186, along the longitudinal length of slide plate 182 and being adjacent to the perimeter side 192. The metal strip 204 includes measurement indicia 208 along the length of the top surface 206 of metal strip 204, as shown in FIG. 8. The top wall surface 188 also includes a second thin, flat elongated metal strip 210 having a top wall surface 212 extending from the proximal end 184 to the distal end 186, along the longitudinal length of side plate 182 and being adjacent to the perimeter side 184. Each of the top surfaces 206, 212 of metal strips 204, 210, respectively, are in the same plane. The top wall surface 188 of slide plate 182 further includes an elongated recessed opening 214 being centrally positioned along the longitudinal axis of slide plate 182, extending from the proximal end 184 to the distal end 186 of slide plate 182 (see FIGS. 8 and 9).

Referring now the FIG. 9, the bottom wall surface 190 includes a substantially elongated oval-shaped recess 216 having interior sidewall surfaces 218, 220, curved end wall surfaces 222, 224 and a base wall surface 226. The oval-shaped recess 216 is centrally positioned along the longitudinal axis of slide plate 182, extending from the proximal end 184 to the distal end 186 of slide plate 182. The base wall surface 226 includes the elongated opening 214 therethrough being centrally positioned on the base wall surface 226 (see FIG. 9), along the longitudinal axis of slide plate 182.

Referring once again to FIGS. 8 to 11, the side clamp assembly 180 includes a dual-action clamping array 228. The dual action clamping array 228 includes an upper knob 230 having a threaded opening 232 therein, an indicator plate 234 having a pair of vertically aligned and centrally positioned insert tabs 236*a*, 236*b* and a centrally positioned mounting opening 238, a bottom oval-shape slide cam 240 having a threaded opening 242 therein, an L-shaped clamping block 244 having a threaded opening 246 therein, a lower knob 248 having a threaded opening 250 therein and a threaded rod 252. The threaded rod 252 is received within openings 232, 238, 214, 242, 246, and 250, of the upper knob 230, the indicator plate 234, the slide plate 182, the bottom slide cam 240, the clamping block 244 and the lower knob 248, respectively, as depicted in FIG. 10. The upper knob 230 includes a stem section 254 having a base wall surface 256. The indicator plate 234 includes a top wall surface 258, a bottom wall surface 260 and a pair of indicator points 262*a* and 262*b*. When assembled, the upper knob 230 is tightened, such that the base wall surface 256 of knob 230 is in contact with the top wall surface 258 of indicator plate 234 and the bottom wall surface 260 of indicator plate 234 is in contact with the top wall surfaces 206, 212 of metal strips 204, 210, respectively, and wherein the indicator point 262*a* is pointing to a particular indicia measurement 208. The bottom slide cam 240 includes a top wall surface 264 and a bottom wall surface 266. The L-shaped clamping block 244 includes an upper wall surface 268, a lower wall surface 270, a front wall surface 272, a rear wall surface 274, an interior (vertically aligned) wall surface 276, an interior (horizontally aligned) wall surface 278 and sidewall surfaces 280, 282. The lower knob 248 includes a stem section 284 having a base wall surface 286. When assembled, the lower knob 248 is tightened, such that the base wall surface 286 of lower knob 248 is in contact with the lower wall surface 270 of clamping block 244, and the upper wall surface 268 of clamping block 244 is in contact with the bottom wall surface 266 of slide cam 240, as well as the bottom wall surface 190 of slide plate 182. The bottom wall surface 266 and 190 of slide cam 240 and slide plate 182, respectively, are in the same horizontal plane, as depicted in FIG. 9. The top wall surface 264 of slide cam 240 is in contact with the base wall surface 226 of the oval-shaped recess 216, such that slide cam 240 slides along the base wall surface 226 of the recess 216 prior to the final clamping adjustment.

In operation, the side clamp assembly 180 is attached to the guide plate 12 as shown in FIG. 11. The operator's initial step is the insertion of the square-shaped tab insert 202 of insertion member 200 within the square-shaped tracking channel 68 at a particular depth (depending upon the size of the work piece). The operator then adjusts the upper knob 230 in a lateral movement to a particular measurement setting 208 via the indicator point 262*a* of indicator plate 234, when then the upper knob 230 is tightened. The operator then adjusts the lower knob 248, such that the interior wall surfaces 276, 278 are aligned and in contact with a side edge 288 and a bottom wall surface 290 of a work piece 292 (e.g., plywood). This completes the clamping process of the first side clamp assembly 180, where then the clamping procedure for the second side clamp assembly 180' is exactly the same as the clamping procedure of the first side clamp assembly 180, as shown in FIG. 11.

Even with the use of only one (section of) guide plate 12 and two (2) side extension clamp assemblies 180, 180', the user can achieve cuts of any length of the work piece material 292 (being greater than the length of the single guide plate 12) by sliding the guide plate 12 relative to an uncut section of material and repositioning one of the side extension clamp assemblies 180 to the uncut section of material.

A second exemplary embodiment of the present invention is illustrated in FIGS. 12 to 14b. Elements illustrated in FIGS. 12 to 14b which correspond to the elements described above with reference to FIGS. 1 to 3b have been designated by corresponding reference numbers increased by one thousand. The second embodiment is constructed and operates in the same manner as the first embodiment 10, unless it is otherwise stated.

With reference to FIGS. 12 to 14b, there is shown an expandable universal guide assembly 1000 for use with handheld, portable power tools. The universal guide assembly 1000 includes a guide plate 1012 made from extruded aluminum, durable plastic or other composite materials having general dimensions of 6 inches in width, 48 inches in length and 0.5 inches in thickness. The guide plate 1012 includes a first working surface area 1014, a second working surface area 1016, a front edge 1018, a rear edge 1020, a first perimeter side edge 1022 and a second perimeter side edge 1024. The first working surface area 1014 of guide plate 1012 includes a centrally positioned first T-shaped track 1026 extending from the front edge 1018 to the rear edge 1020, along the longitudinal length of guide plate 1012. The first T-shaped track 1026 includes a pair of V-notched grooves 1302a, 1302b, a plurality of vertically aligned, interior sidewall surfaces 1030a, 1030b, 1032a and 1032b and an interior base wall surface 1034 having a pair of centrally positioned peak-shaped ribs 1304a, 1304b thereon for forming an interior T-shaped tracking channel 1036. The peak-shaped ribs 1304a, 1304b are used for strengthening and self-centering of the slide bar 1074 (to be discussed hereinafter). The first working surface area 1014 of guide plate 1012 also includes a plurality of relief elements 1038 for the deposit of sawdust, metal filings and the like, in order to not create a friction problem when the guide plate 1012 is in operation.

Referring again to FIGS. 12 to 14b, the second working surface area 1016 includes a second T-shaped track 1040 being positioned and adjacent to the first perimeter side edge 1022 and is extending from the front edge 1018 to the rear edge 1020, along the longitudinal length of guide plate 1012. The second T-shaped track 1040 includes a pair of V-notched grooves 1306a, 1306b, vertically aligned, interior sidewall surfaces 1044a, 1044b, 1046a and 1046b, and an interior base wall surface 1048 having a pair of centrally positioned peak-shaped ribs 1308a, 1308b thereon for forming an interior T-shaped tracking channel 1050. The second working surface area 1016 also includes a third T-shaped track 1052 being positioned and adjacent to the second perimeter side edge 1024 and is extending from the front edge 1018 to the rear edge 1020, along the longitudinal length of guide plate 1012. The third T-shaped track 1052 includes a pair of V-notched grooves 1310a, 1310b, a vertically aligned, interior sidewall surfaces 1056a, 1056b, 1058a and 1058b, and an interior base wall surface 1060 having a pair of centrally positioned peak-shaped ribs 1312a, 1312b thereon for forming an interior T-shaped tracking channel 1062. The second working surface area 1016 further includes a plurality of relief elements 1065 for the collection of sawdust, metal filings and the like.

The guide plate 12 further includes rectangular-shaped weight relief channels 1314. The weight relief channels 1314 extend from the front edge 1018 to the rear edge 1020, along the longitudinal length of guide plate 1012. The weight relief channels 1314 of guide plate 1012 provide for a reduction in total weight, as compared to the total weight of guide plate 12 of the first embodiment.

Referring now to FIGS. 12, 13, 14a and 14b, the tracking channels 1036, 1050 and 1062 for tracking 1026, 1040 and 1052, respectively, are used for receiving one or more substantially I-shaped slide bars 1074 therethrough. Slide bars 1074 are made of extruded aluminum, plastic or other composite materials and have lengths of 24 inches or 48 inches. Each slide bar 1074 includes an upper wall 1076 having an upper surface 1077 with a pair of spaced-apart notched grooves 1316a, 1316b thereon and having upper sidewall surfaces 1318a, 1318b each with a notched groove 1320a, 1320b thereon, a lower base wall 1078 having a lower surface 1079, opposing end surfaces 1080, 1082 and an integrally connected column 1084 between the upper and lower walls 1076 and 1078. The lower base wall 1078 includes opposing notched ribs 1322a, 1322b being integrally attached thereto. Each slide bar 1074 includes two or more setscrew openings 1088a, 1088b, 1088c or 1088d (depending upon the length of slide bar 1074) for receiving a setscrew 1090 therein. Each setscrew opening 1088a, 1088b, 1088c and 1088d includes a counter-sink groove 1092 therein. Each of the setscrew openings 1088a to 1088d extend from the upper surface 1077 to the lower base surface 1079. Each of the setscrews 1090 are of sufficient length, such that each end tip 1094 of the setscrew 1090 is set off from the interior base wall surfaces 1034, 1048 or 1060 of tracking channels 1036, 1050 or 1062, respectively, as depicted in FIG. 11b. The slide bar(s) 1074 become self-aligned within any one of the tracking channels 1036, 1050 or 1062, wherein the slide bar(s) 1074 will interact with the handheld power tools.

Additionally, the slide bar 1074 includes an I-shaped weight relief channel 1324. The I-shaped weight relief channel extends from the front opposing end surface 1080 to the rear opposing end surface 1082, along the longitudinal length of slide bar 1074 (see FIG. 14b). The notched grooves 1316a, 1316b, 1320a, 1320b on the upper wall 1076 of slide bar 1074 will interfit with various power tool attachment assemblies.

The universal guide assembly 10 or 1000 is used with various handheld power tools each having an attachment assembly used in conjunction with the universal guide assembly 10 or 1000. Each attachment assembly for a given power tool is unique in its structure and operation.

Referring now to FIGS. 15a to 17, there is shown a router attachment assembly 1400 for use with a conventional portable, handheld router 1402. The router attachment assembly 1400 includes an adapter member 1404 having a front-end wall 1406 and a convex end wall 1408. Wherein, the front wall 1406 includes a pair of spaced-apart adapter pins 1410a, 1410b and the convex rear wall 1408 includes a centrally located male hinge element 1412 having a longitudinal pin opening 1414 therethrough.

The router attachment assembly 1400 also includes an attachment arm 1416 having a top wall surface 1418, a bottom wall surface 1420, a concave front-end wall 1422 and a rear end wall 1424. Wherein, the concave front-end wall 1422 includes a pair of spaced-apart hinge elements 1424a, 1424b, each having a longitudinal pin opening 1426a, 1426b therethrough. The spaced-apart hinge elements 1424a, 1424b receive the male hinge element 1412 therebetween, such that pin openings 1426a, 1414 and 1426b are aligned with each other in order to receive a hinge pin 1426 therethrough to which form a hinge member 1428 (see FIG. 15). The hinge member 1428 allows the attachment arm 1416 to move in an upwardly directed arc A relative to the adapter member 1404. The top wall surface 1418 of attachment arm 1416 includes an elongated grooved channel 1430 extending in a longitudinal axis from a proximate front-end wall 1422 to a proximate rear end wall 1424. The groove channel 1430 extends in depth (along a vertical axis) from the top wall surface 1418 to the bottom wall surface 1420. The bottom wall surface 1420 includes a center tracking bar 1432, and a pair of opposing tracking channels 1434, 1436, wherein the center tracking bar 1432 is between the opposing tracking channels 1434 and 1436 accordingly.

Figure 15A:
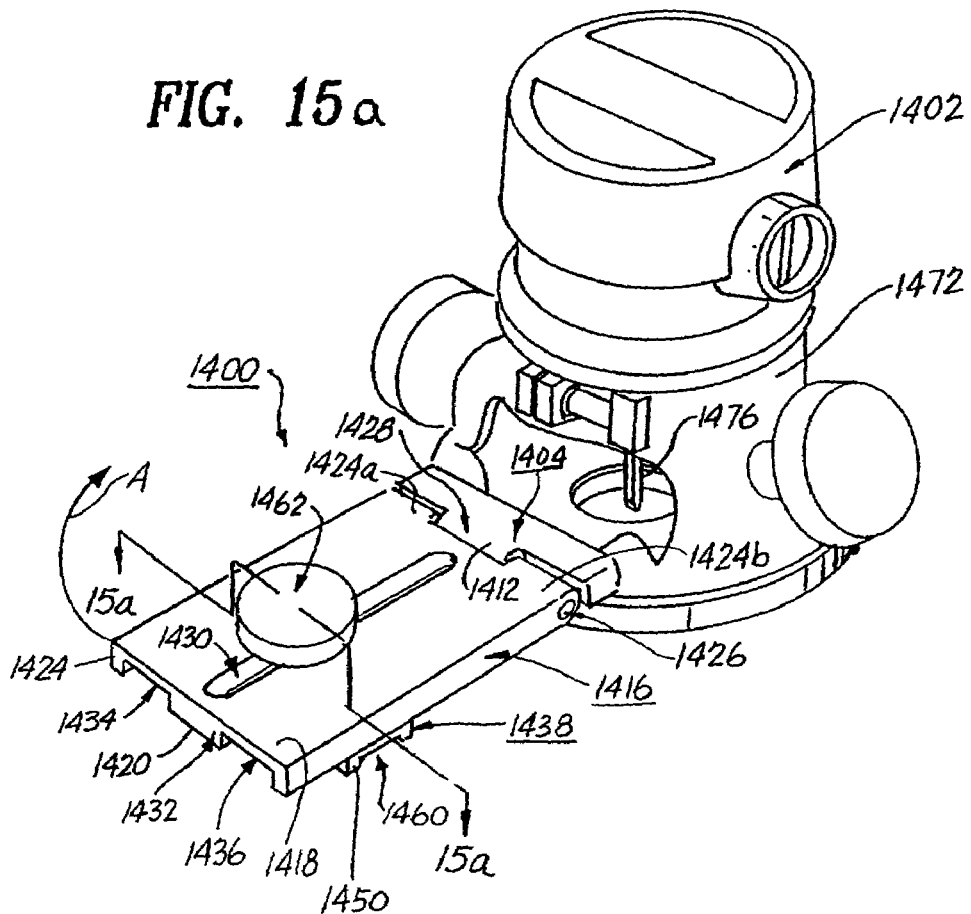
FIG. 15a is a perspective view of a router attachment assembly.
Figure 15B:
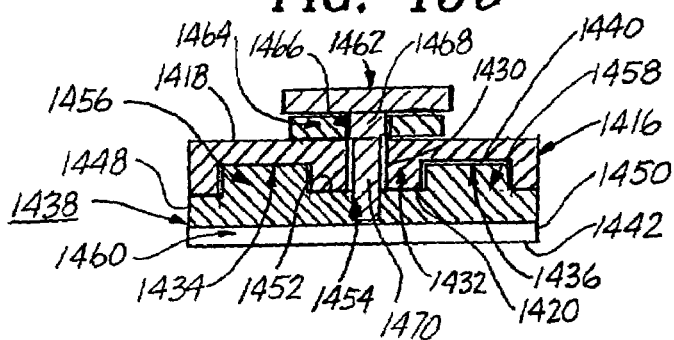
FIG. 15b is a cross-sectional view of the router attachment assembly of FIG. 15a, showing the interfit of a sliding router shoe within a flexible attachment arm locked in place by an adjustment knob.
Figure 16A:
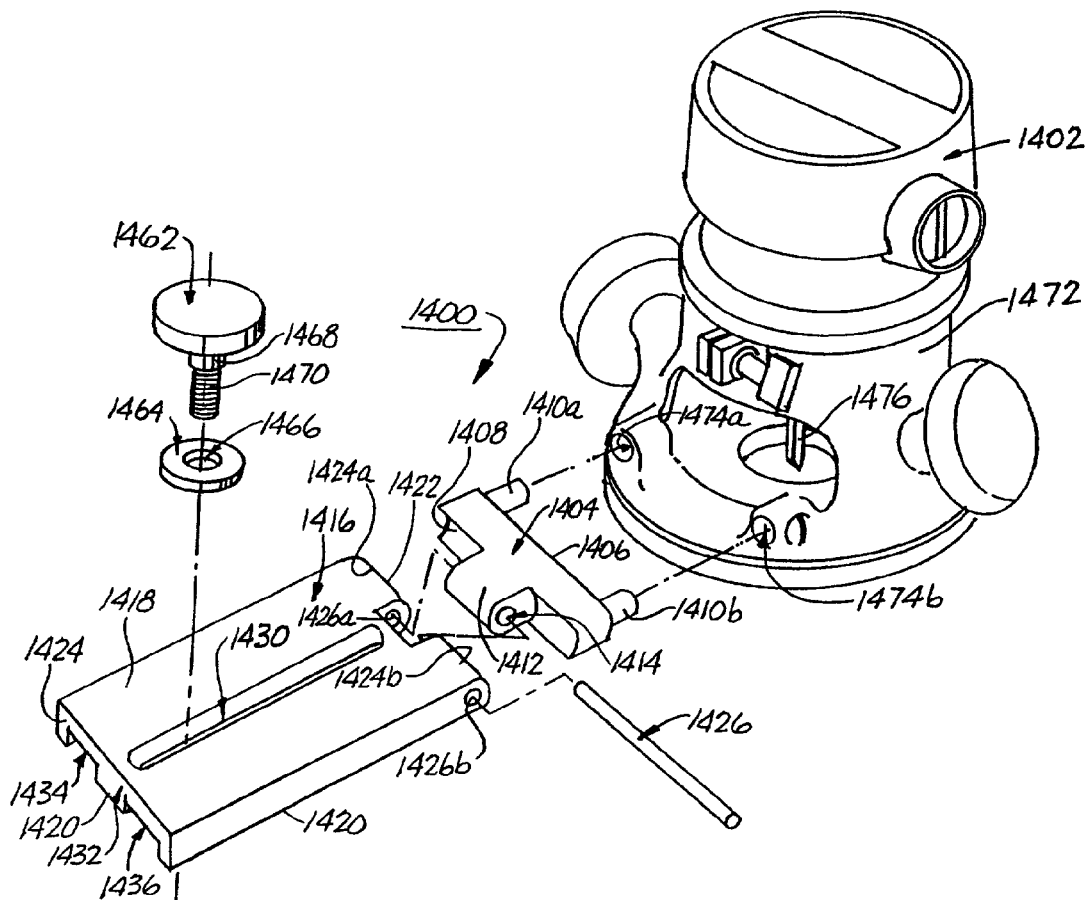
Figure 16B:
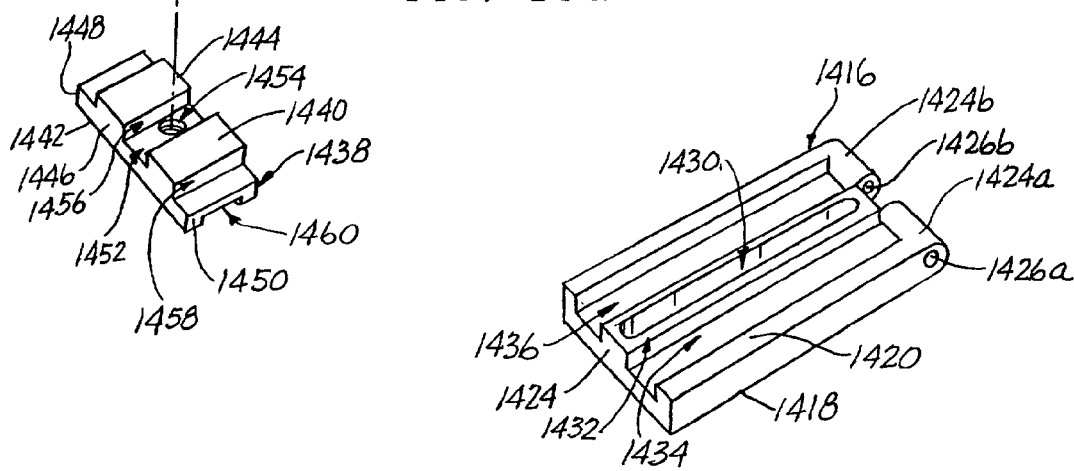
FIG. 16b is a bottom perspective view of the router attachment assembly of FIG. 16a, showing the flexible attachment arm only.

The router attachment assembly 1400 further includes a router sliding shoe 1438 having a top wall surface 1440, a bottom wall surface 1442, a front-end wall 1444, a rear end wall 1446 and opposing sidewalls 1448, 1550. The top wall surface 1446 of sliding shoe 1438 includes a center tracking channel 1452 having a threaded opening 1454 therein, and a pair of opposing tracking bars 1456, 1458, wherein the center tracking channel 1452 is between the opposing tracking bars 1456 and 1458 accordingly. The center tracking channel 1452, as well as the opposing tracking bars 1456 and 1458 extend along a longitudinal axis from the front-end wall 1444 to the rear end wall 1446. The bottom wall surface 1442 of sliding shoe 1438 includes a central located tracking channel 1460 which extends along a lateral axis from the first sidewall 1448 to the second sidewall 1450, as depicted in FIG. 16*a*. The center tracking bar 1432 and opposing tracking channels 1434, 1436 of attachment arm 1416 detachably interfit with the center tracking channel 1452, and opposing tracking bars 1456, 1458 of sliding shoe 1438, respectively, as shown in FIGS. 15*a* and 16*a*. Additionally, the router attachment assembly 1400 includes an adjustment knob 1462 and a washer 1464 having an axial opening 1466 therein. The adjustment knob 1462 includes a stem section 1468 and a threaded rod section 1470 being integrally attached to the stem section 1468. The sliding shoe 1438 is fixedly locked in place via the adjustment knob 1462, wherein the threaded rod section 1470 is received within the axial opening 1466 of washer 1464, through the grooved channel 1430 of attachment arm 1416, and received within the threaded opening 1454 of the center tracking channel 1452 of sliding shoe 1438, respectively, in order to lock down the sliding shoe 1438 to a predetermined position with respect to the universal guide assembly 10 or 1000.

The router 1402 includes a conventional router housing 1472 having a pair of spaced-apart adapter pin openings 1474*a*, 1474*b* for receiving adapter pins 1410*a* and 1410*b* of adapter member 1404 for attaching the assembled router attachment assembly 1400 to the conventional router 1402, as shown in FIGS. 15*a* and 16*a*.

Figure 17:
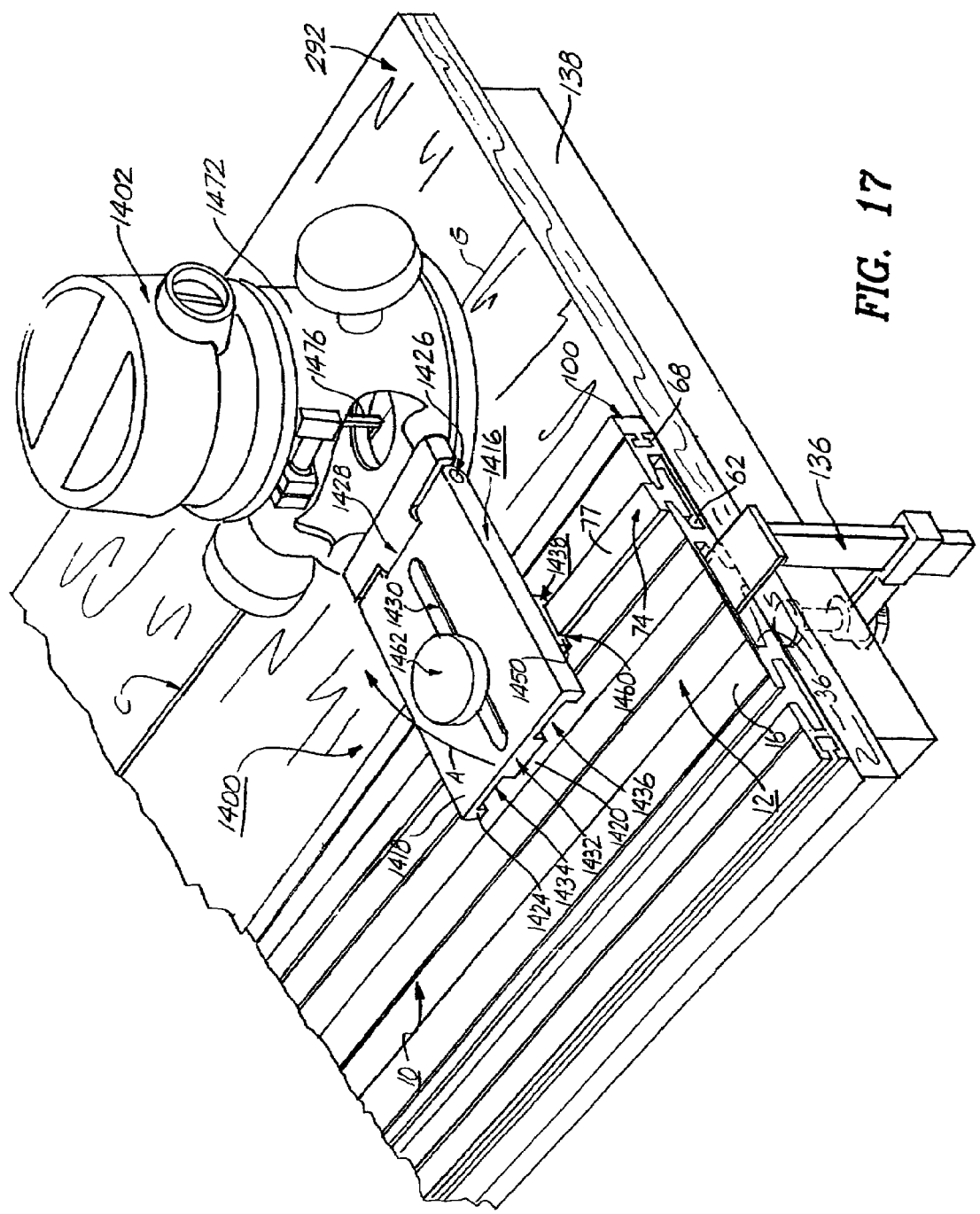
FIG. 17 is a perspective view of the router attachment assembly in conjunction with the universal guide assembly of FIGS. 2 and 15a, showing the handheld router in operational use.

In operation, as shown in FIG. 17, the user clamps the universal guide assembly to the work piece 292 via slide under clamps 136 in order to hold in position one or more guide plates 12, 12' to the work piece 292. Side bar 74 and end edge bar 100 are appropriately positioned within tracking channels 62 and 68, respectively, of guide plate 12. The router attachment arm 1416 in conjunction with the sliding shoe 1438 allows for the easy and accurate positioning of the guide plate 12 with respect to the work piece 292 to be grooved. The operator now secures the guide plate 12 within 5 inches to 12 inches of the desired groove line G. The user then places the sliding shoe 1438 of the router attachment assembly 1400 on the slide bar 74 of guide plate 12, such that the tracking channel 1460 of the sliding shoe 1438 slides along the upper surface 77 of slide bar 74. Where then the user tightens the adjustment knob 1462 along the elongated grooved channel 1430 of attachment arms 1416 to the desired position of groove line G. This step affords the router attachment assembly 1400 to move along the length of slide bar 74 as the router 1402 performs its cutting function. The use of the guide plate 12 with the router attachment arm 1416 allows the placement of a router bit 1476 of router 1402 at a precise location (groove line G) along the surface of the work piece 292. This is especially difficult due to many different sizes and profiles of router bits 1476 that makes the step of the placement of the router bit 1476 on the groove line G normally hard to do. Previous (prior art) router guide devices are limited to "edge" guides having limited working surface and blind spots (as the router does not have access to all of the working surface area) and without the secure movement of the router relative to the work piece. All prior art edge guides protect the movement of the router only on one side of the edge guide and are limited to only the length of the edge guide as the router can go out on a tangent and not on its intended cut line. The use of the router attachment assembly 1400 and the universal guide assembly of the present invention prevents any problems associated with the previous prior art router guide devices. After the router 1402 completes its cut C by the router bit 1476, the attachment arm 1416 of the router attachment assembly 1400 is flipped upwardly via hinge member 1428 in which to remove the sliding shoe 1438 from the slide bar 74 of guide plate 12.

Figure 18:
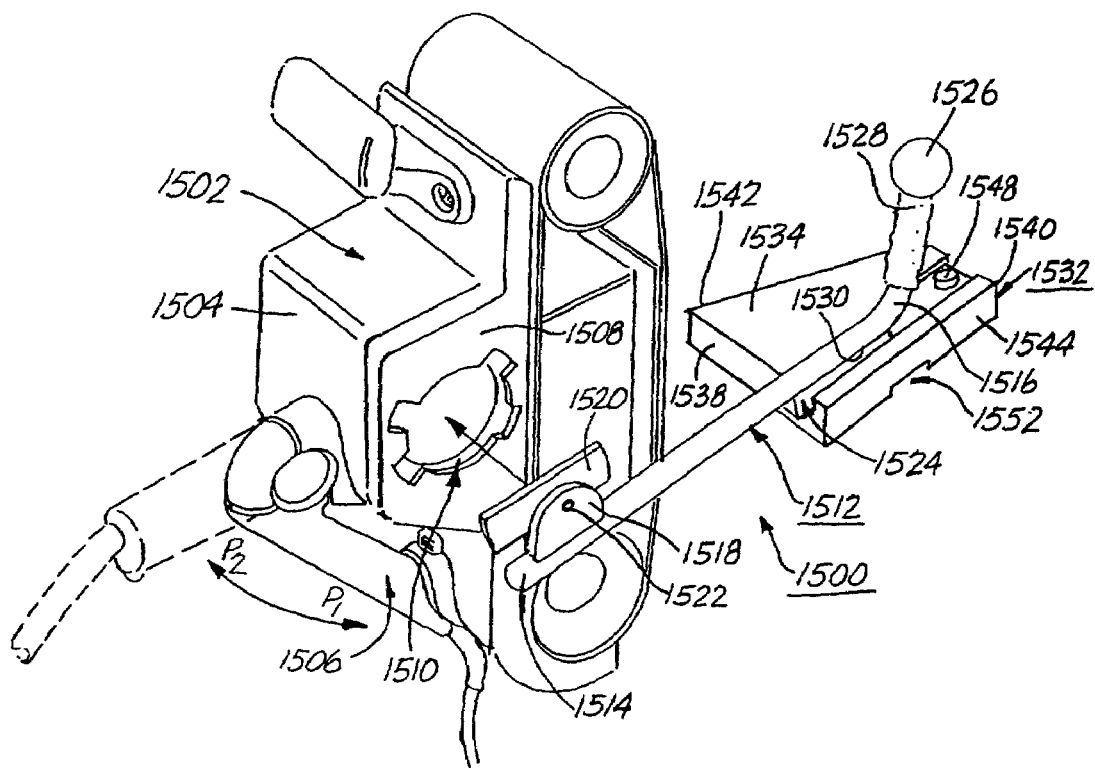
FIG. 18 is a perspective view of a sander attachment assembly with a handheld portable belt sander.
Figure 19:
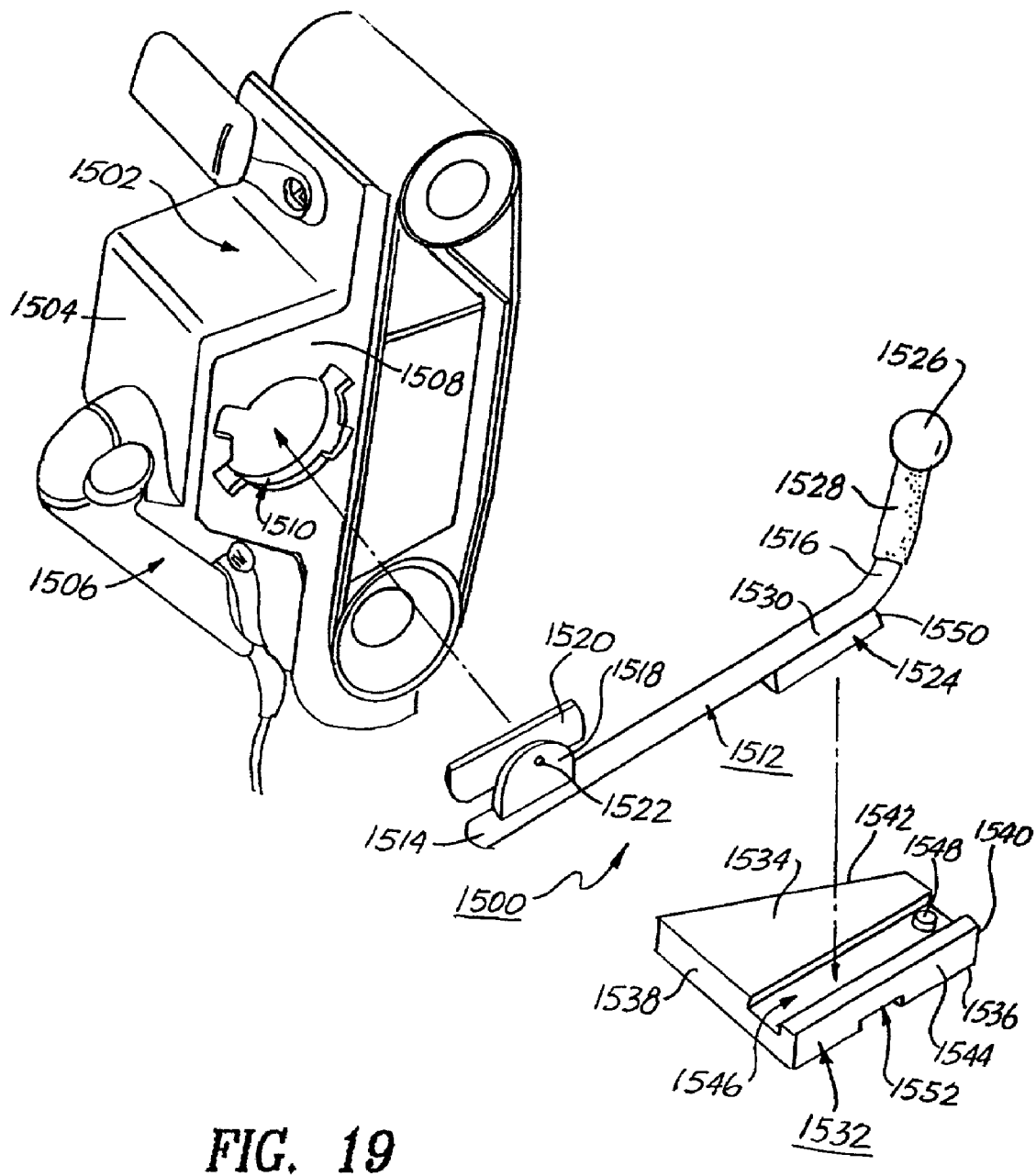
FIG. 19 is an exploded perspective view of the sander attachment assembly of FIG. 18.
Figure 20:
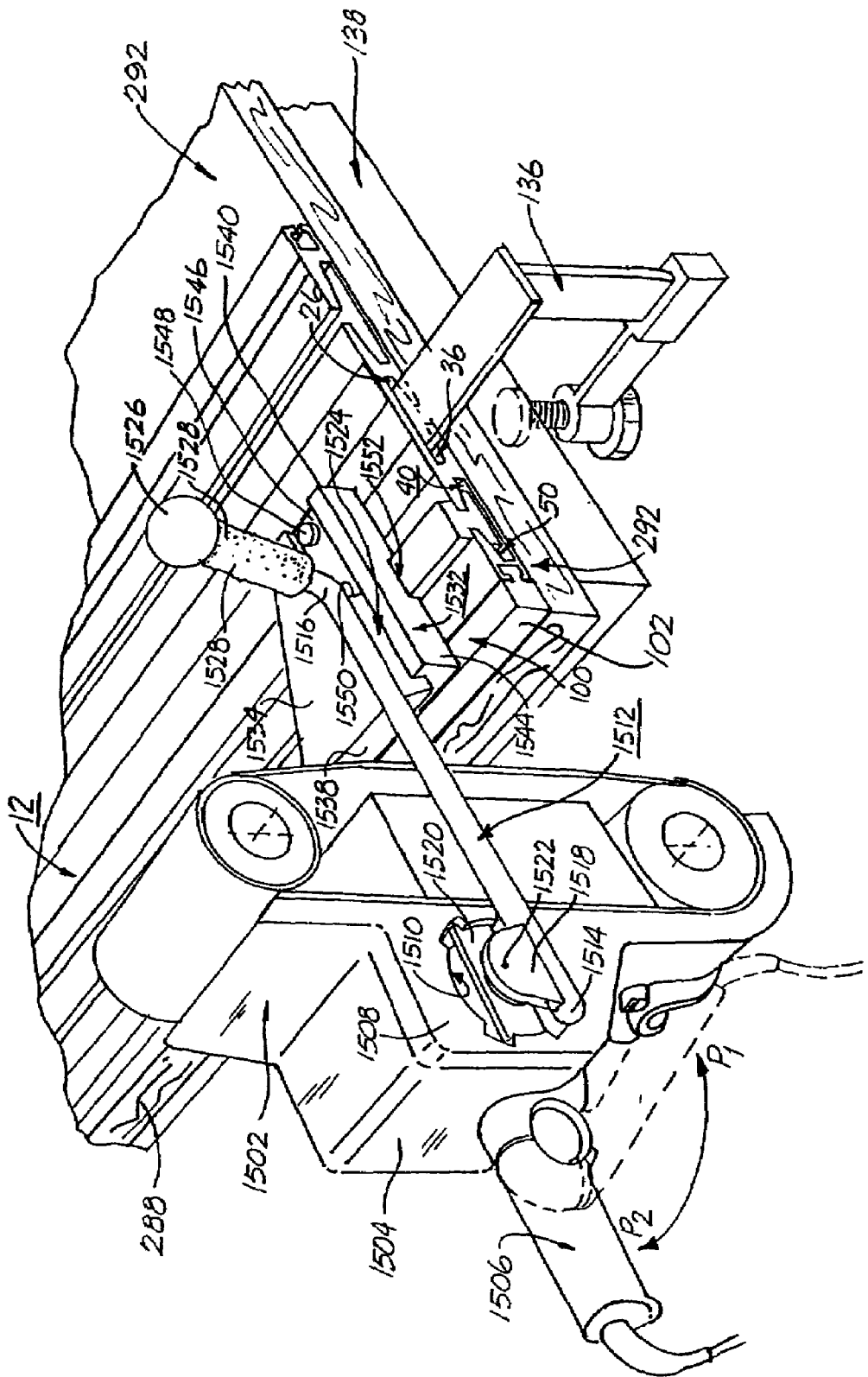
FIG. 20 is a perspective view of the sander attachment assembly with the universal guide assembly of FIGS. 2 and 18, showing the belt sander in operational use.

With reference to FIGS. 18 to 20, there is shown a sander attachment assembly 1500 for use with a conventional portable, handheld belt sander 1502. The belt sander 1502 includes a sander housing 1504 having a pivoting handle 1506 that rotates from a vertical position $P_1$ to a horizontal position $P_2$ when in operational use with the guide plate 12 of the universal guide assembly 10 of the present invention. The sander housing 1504 includes a sidewall 1508 having a female insert member 1510 thereon (see FIGS. 18 and 19). The sander attachment assembly 1500 includes an extension arm 1512 having a proximal end 1514 and a distal end 1516. The proximal end 1514 of extension arm 1512 includes a mounting plate 1518 being integrally attached to the proximal end 1514, wherein the mounting plate 1518 has a male insert member 1520 attached thereto by a mounting screw 1522. The male insert member 1520 is received within the female insert member 1510 of sander housing 1504 in which to lock the extension arm 1512 of the sander attachment assembly 1500 in place with respect to the belt sander 1502 (see FIGS. 18 and 20). The distal end 1516 of extension arm 1512 includes a sliding arm shoe 1524 and an attachment knob 1526 with a handle grip 1528. The sliding arm shoe 1524 is integrally attached to a longitudinal section 1530 of extension arm 1512 (see FIG. 19) in a downward relationship.

As shown in FIGS. 18 and 19, the sander attachment assembly 1500 includes a sliding sander shoe 1532 with a top wall surface 1534, a bottom wall surface 1536, a front wall end 1538, a rear wall end 1540, an angled sidewall 1542 and a second sidewall 1544. The top wall surface 1534 of sliding shoe 1532 includes a tracking channel 1546 having a stop pin 1548. The stop pin 1548 is adjacent to the rear wall end 1540. The tracking channel 1546 extends along a longitudinal axis from the front wall end 1538 to the rear wall end 1540. The sliding arm shoe 1524 of extension arm 1512 is received within the tracking channel 1546 and a distal end wall 1550 of the sliding arm shoe 1524 is held from moving forward by the stop pin 1548. The bottom wall surface 1536 of sliding shoe 1532 includes a centrally located tracking channel 1552, which extends along a lateral axis from the angled sidewall 1542 to the (second) sidewall 1544.

Figure 29:
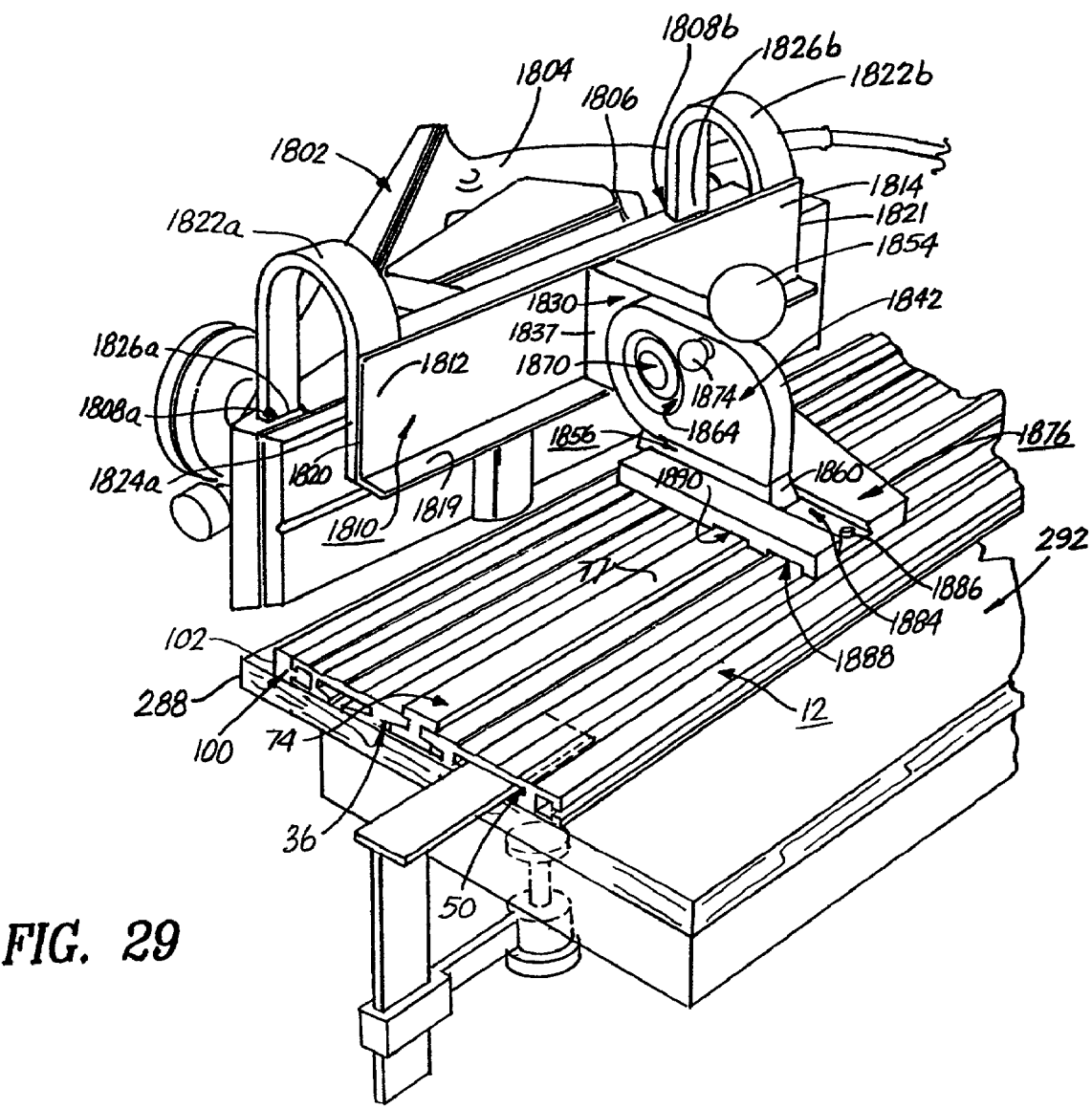
FIG. 29 is a perspective view of the planer attachment assembly with the universal guide assembly of FIGS. 1 and 27, showing the planer in operational use.

Handheld belt sanders 1502 are typically designed for flat or horizontal sanding of a work surface, but in many instances the belt sander 1502 is used for edge or vertical sanding of a side or perimeter edge of a work piece 292 (see FIG. 29). This edge sanding is a most difficult task for the operator, as it is "back-breaking" as the belt sander 1502 is heavy to hold and very aggressive and hard in maintaining a vertical position to achieve a 90° vertical sanding edge and a straight edge. The sander attachment assembly 1500 with the universal guide assembly 10 allows the operator to achieve perfect sanding at any desired angle along the sanding line R. Additionally, the belt sander 1502 is equipped with a pivoting handle 1506 that will make the operation of the belt sander 1502 more ergonomical and eliminates back injuries to the operator when in operational use. The attachment assembly 1500 allows the belt sander 1502 to perfectly sand an edge 288 of work piece 292 in all three axial directions.

In operation, as shown in FIG. 20, the user clamps the universal guide assembly 10 to the work piece 292 and optional work table 138 by slide under clamps 136 in order to hold in position one or more guide plates 12, 12' to the work piece 292 and the work table 138 co-jointly. Slide bar 74 and edge bar 100 are appropriately positioned within tracking channels 50 and 72, respectively, of guide plate 12. The user has also vertically aligned the outer wall 102 of edge bar 100 with that of the side edge 288 of the work piece 292 prior to the clamping by the slide under clamps 136. Also, the extension arm 1512 is set at a desired angle (e.g., 45°, 60° or 90°) via the mounting plate 1518, as the mounting plate 1518 is adjusted and tightened by the mounting screw 1522 for the aforementioned desired angle. Further, by the combining of the extension arm 1512 and sander sliding shoe 1532 with that of the guide plate 12, the operator can always achieve a perfect sanding result of the side edge 288 of the work piece 292 at the desired angle. Mistakes are vertically eliminated because the sander extension arm 1512 is keeping the belt sander 1502 on the desired angle and the sander sliding shoe 1532 controls the straightness of the sanding line R of the belt sander 1502 when operated. The operator then places the lower tracking channel 1552 of the sander sliding shoe 1532 on the upper surface 77 of the slide bar 74, such that the front wall end 1538 of sliding shoe 1532 is also in alignment with that of the outer wall 102 of edge bar 100 and side edge 288 of work piece 292 (see FIG. 20). Minimal sanding is easily achieved by placing the outer wall 102 of edge bar 100 (guide plate 12) on the desired location (sand line R) of the work piece 292 being sanded. The operator then slides and positions the sliding arm shoe 1524 of extension arm 1512 within the upper tracking channel 1546. The operator now proceeds to rotate the pivoting handle 1506 from its vertical position $P_1$ to its horizontal position $P_2$ (see FIG. 20), where then the belt sander 1502 is in an operational state for sanding such that one hand of the operator is on the pivoting handle 1506 and the other hand is on the attachment knob 1526 and handle grip 1528, accordingly. With the operators' hands in place, the operator can leverage a proper amount of pressure to sand away the side edge 288 of work piece 292 to a correct depth and over sanding is eliminated because the tracking channel 1546 of the sliding shoe 1532 is equipped with the depth control stop pin 1548 that stops the belt sander 1502 at the desired sanding line R which is at the outer wall side 102 of edge bar 100 of guide plate 12. At the end of the sanding process of side edge 288 of work piece 292, the operator removes the sliding arm shoe 1524 of extension arm 1512 from the upper tracking channel 1546 of the sliding sander shoe 1532. The sliding sander shoe 1532 can then be removed from the sliding bar 74.

Figure 21A:
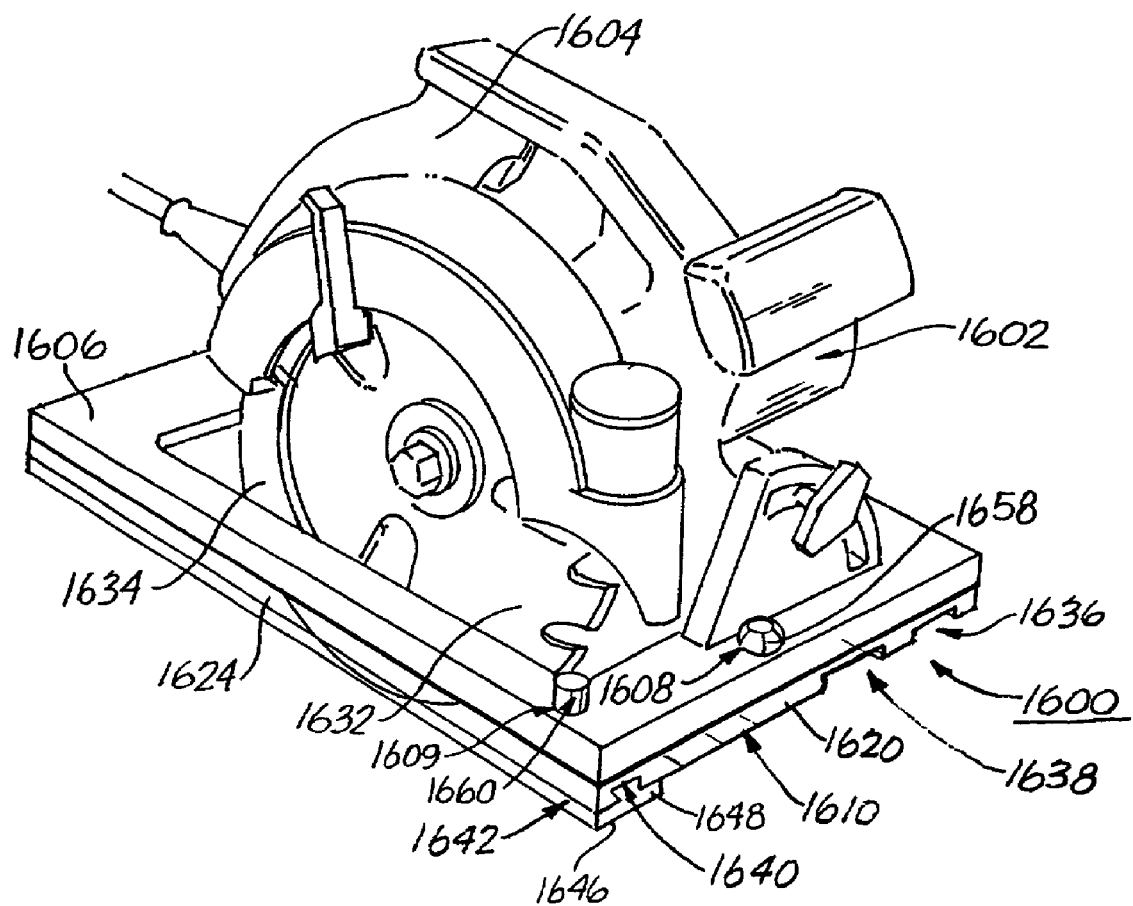
FIG. 21a is a perspective view of a saw attachment assembly with a handheld portable circular saw.
Figure 21B:
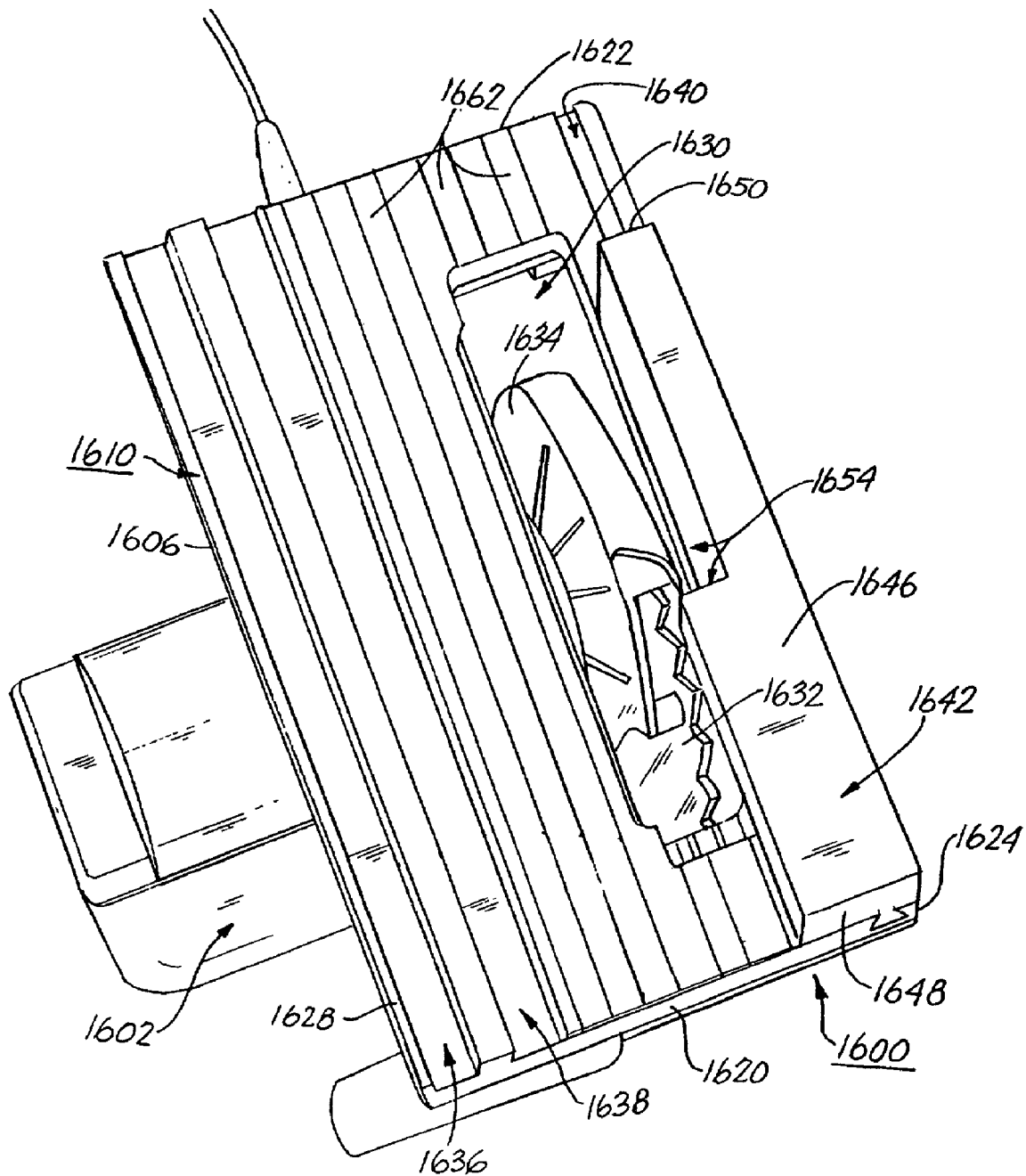
Figure 22:
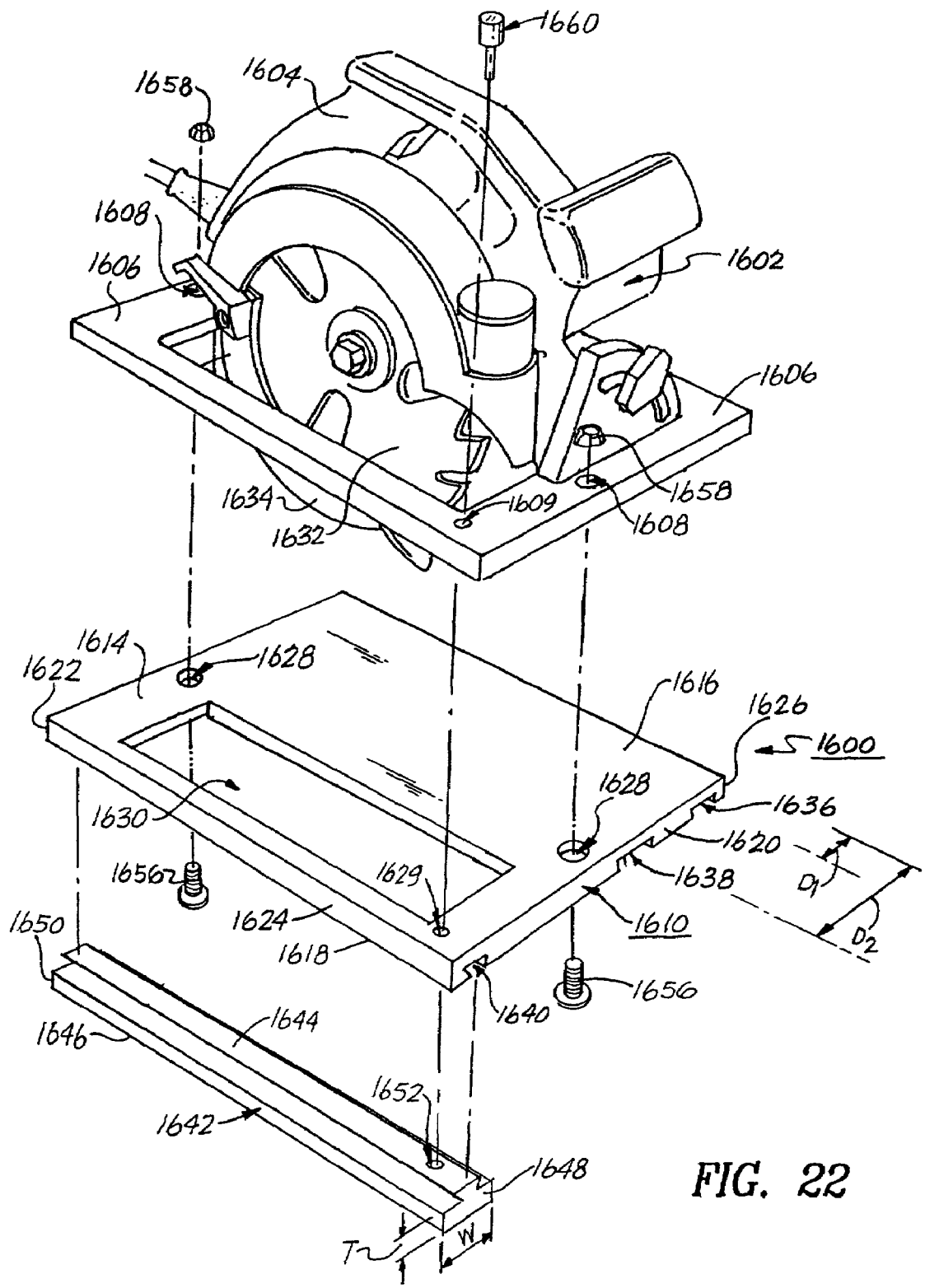
Figure 23:
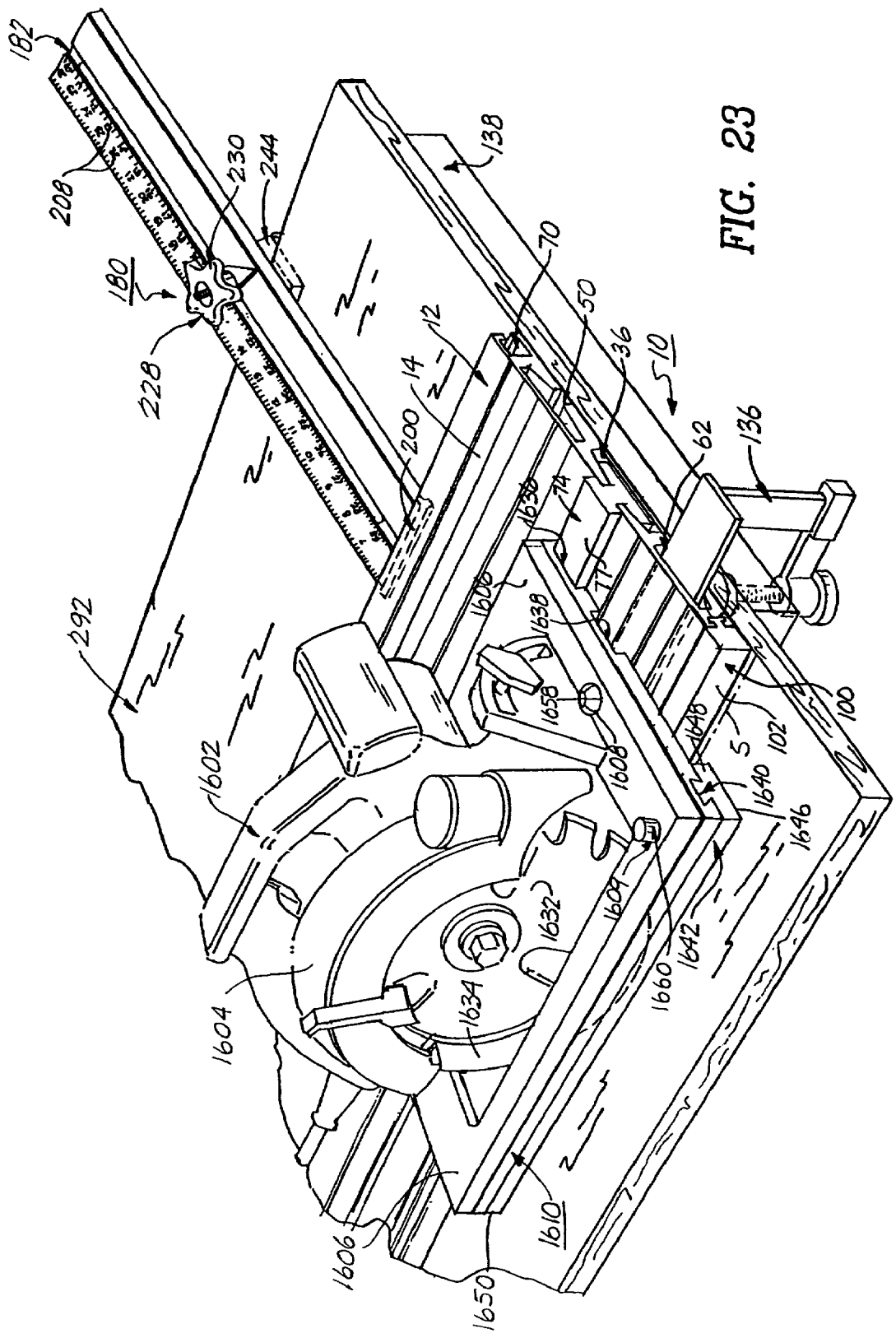
FIG. 23 is a perspective view of the saw attachment assembly with the universal guide assembly of FIGS. 2 and 21a, showing the circular saw in operational use.

Referring to FIGS. 21 to 23, there is shown a circular saw attachment assembly 1600 for use with a conventional portable, handheld circular saw 1602. The circular saw 1602 includes a housing 1604 having a base plate 1606. The base plate 1606 includes a pair of threaded mounting openings 1608 and a retainer pin opening 1609 therethrough. The saw attachment assembly 1600 includes a sliding saw shoe 1610 having a proximal end 1612 and a distal end 1614. The sliding saw shoe 1610 also includes a top wall surface 1616, a bottom wall surface 1618, a front-end wall 1620, a rear end wall 1622 and sidewalls 1624, 1626. The sliding saw shoe 1610 further includes a pair of mounting openings 1628 and a retainer pin opening 1629 and a rectangular opening 1630 for receiving of a circular saw blade 1632 and a blade guard 1634 therethrough (see FIGS. 21, 21*a* and 22) of the circular saw 1602. The bottom wall surface 1618 includes a 45° cut tracking channel 1636, a 90° cut tracking channel 1638 and a dovetailed receiving channel 1640 for receiving of an anti-split sliding bar 1642 therein. The anti-split sliding bar 1642 includes a top wall surface 1644, a bottom wall surface 1646, a front-end wall 1648 and a rear end wall 1650. The top wall surface 1644 includes a retainer pin opening 1652 being adjacent to the front-end wall 1648. The bottom wall surface 1646 includes an L-shaped notched section 1654 for receiving a portion of the saw blade 1632 thereto (see FIG. 21*a*). The optional anti-split sliding bar 1642 prevents the cut work piece 292 from splitting or splintering while being cut. The anti-split sliding bar 1642 has a thickness T which is also the same thickness of guide plate 12, allowing the saw sliding shoe 1610 to be level relative to the surface of the work piece 292. Also, the anti-split sliding bar 1642 has a width W, in which width W represents a particular saw blade thickness. The anti-split sliding bar 1642 can be sized for any saw blade thickness, as different widths W represent different saw blade thicknesses (see FIG. 22). The 45° cut tracking channel 1636 is used when a 45° beveled side edge is desired on the working piece 292, and the 90° cut tracking channel 1638 is used when a 90° straight edge is desired on the working piece 292 (see FIG. 23). The tracking and receiving channels 1636, 1638 and 1640, respectively, extend along a longitudinal axis from the front-end wall 1620 to the rear end wall 1622. The saw sliding shoe 1610 is mounted to the base plate 1606 of circular saw 1602 by alignment of mounting openings 1628, 1608, of sliding shoe 1610 and base plate 1606, respectively, for receiving of a mounting bolt and nut 1656 and 1658 therethrough (see FIGS. 21*a* and 21*b*). The anti-split sliding bar 1642 is kept in place and from moving within the receiving channel 1640 by the alignment of the retainer pin openings 1609, 1629, 1652 of base plate 1606, of sliding shoe 1610 and of sliding bar 1642, respectively, for receiving a retainer pin 1660 therethrough (see FIG. 22). The bottom wall surface 1618 also includes a plurality of relief elements 1662 thereon for the collection of sawdust, metal filings and the like. The dust relief elements 1662 of sliding shoe 1610 are provided such that the user does not have to push the sawdust under the guide plate 12 but instead the sawdust is between the relief elements 1662 on the sliding shoe 1610 and the relief elements 64 on the guide plate 12 without compromising the sliding of the sliding shoe 1610 relative to the clamped guide plate 12 when using the circular saw 1602 in cutting the work piece 292 (see FIG. 23). The sliding shoe 1610 and guide plate 12 when attached with each other, only allows an opening that is as wide as the saw blade 1632, and very little sawdust escapes. The space between the bottom wall surface 1618 of sliding shoe 1610 and the working surface 16 of guide plate 12 is able to retain approximately 90 to 95% of the sawdust generated by circular saw 1602 when cutting a piece of plywood. Also, the unused tracking channel 1636 or 1638 becomes a sawdust relief channel for retaining the sawdust generated by circular saw 1602. This sawdust retention by sliding shoe 1610 and guide plate 12 provides a healthier and safer environment for the operator.

The circular saw sliding shoe 1610 can be designed as an original part of the circular saw 1602 or the saw sliding shoe 1610 can be provided as an add-on accessory.

The circular saw attachment assembly 1600 with the guide plates 12 and 12' of the universal guide assembly 10 provides for full access to any surface area within a particular work piece 292 (i.e., a 4 foot by 8 foot sheet of plywood) in order to cut anywhere on that surface or work piece 292 by circular saw 1602. There are no blind spots on the surface of the work piece 292 when using attachment assembly 1600 and the guide plate(s) 12, 12' together as shown in FIG. 23. In operation, as shown in FIG. 23, the user clamps the universal guide assembly 10 to the work piece 292 by slide under clamps 136 in order to hold in position one or more guide plates 12, 12' to the work piece 292, as well as a side extension clamping assembly 180. Slide bar 74 and edge bar 100 are appropriately positioned within tracking channels 50 and 72, respectively, of guide plate 12. The operator then positions either the 45° cut tracking channel 1636 or the 90° cut tracking channel 1638 of the circular saw attachment assembly 1600 on the upper surface 77 of slide bar 74 (depending upon the type of edge, 45° or 90°, the user desires on work piece 292). By positioning the tracking channels 1636 and 1638 at precise distances $D_1$ and $D_2$ relative to the outer side 1626 of sliding shoe 1610, both of the tracking channels 1638 and 1638 can use the same slide bar 74, thus when making either a 45° or 90° cut, both are done at the same cutting line S. Further, by placing either one of the tracking channels 1636 or 1638 on the slide bar 74 of guide plate 12 at the predetermined cutting line S, the operator eliminates the need to offset the guide plate 12 on the surface of the work piece 292 which always avoids the inaccurate placement of the guide plate 12 relative to the cutting line S. Also, minimal trimming is easily achieved by placing the outer wall 102 of edge bar 100 (guide plate 12) on the desired position (cut line S) of the work piece 292 while being cut by saw blade 1632. The operator then slides the anti-split sliding bar 1642 into the dove-tailed receiving channel 1640, where then the sliding bar 1642 is retained via the retainer pin 1660 being received through retainer openings 1609, 1629, 1652 accordingly. Typically, when cutting a piece of plywood 292 with a circular saw 1602, the saw blade 1632 rotates in a counter-clockwise movement such that the underside of plywood is cut clearly and the top side of the plywood tends to be jagged and/or splintered. This problem is eliminated with the use of the anti-split sliding bar 1642 within the receiving channel 1640 of sliding shoe 1610. None of the prior art circular saw guide devices offer this type of protection to the work piece 292 for preventing splintering of the work piece 292. The guide plate 12 also offer the benefits of an anti-split device because the cutting line is always at the outer wall 102 of edge bar 100 in which to hold down the guide plate 12 to the work piece 292 (see FIG. 23). When in operational use, the saw blade 1632 is between the anti-split sliding bar 1642 and the outer wall 102 of edge bar 100 which allows a clean saw cut through work piece 292 without splintering or damage to the saw blade 1632. The disengage the circular saw 1602 from the slide bar 74 on guide plate 12, the user simply lifts the circular saw 1602 and the attached saw attachment assembly 1600 vertically from the work piece 292.

Figure 24:
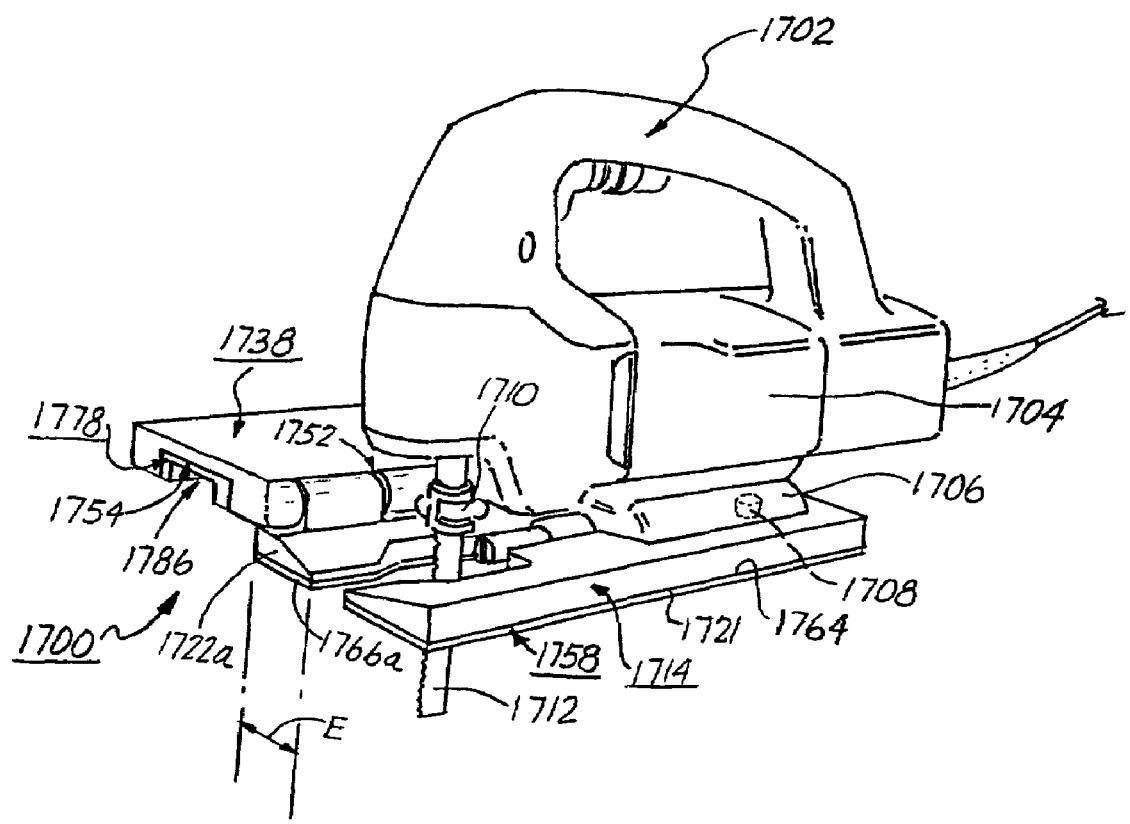
FIG. 24 is a perspective view of a jig saw attachment assembly with a handheld portable reciprocating jig saw.
Figure 25A:
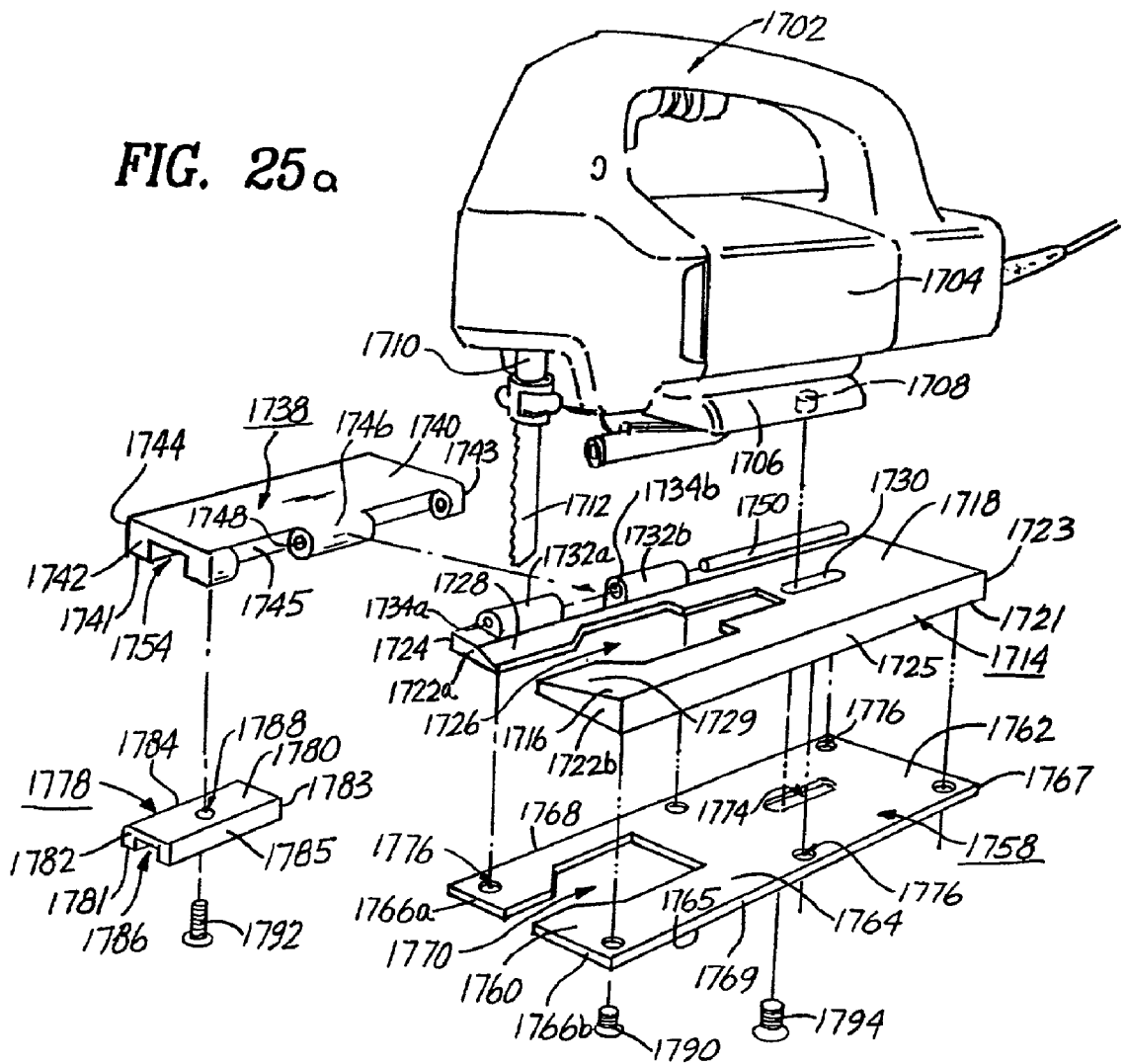
FIG. 25a is an exploded perspective view of the jig saw attachment assembly of FIG. 24.
Figure 25B:
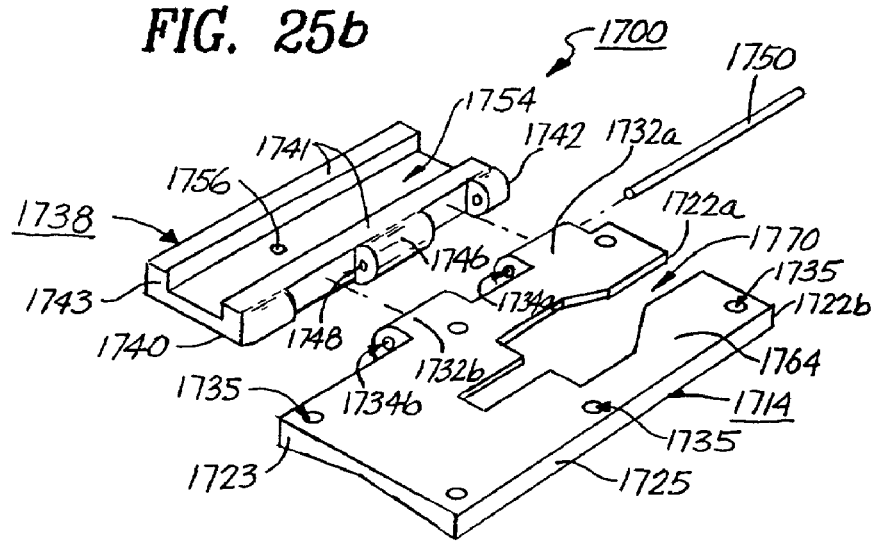
FIG. 25b is a bottom perspective view of the jig saw attachment assembly of FIG. 25a, showing an attachment arm an adapter member only.
Figure 26:
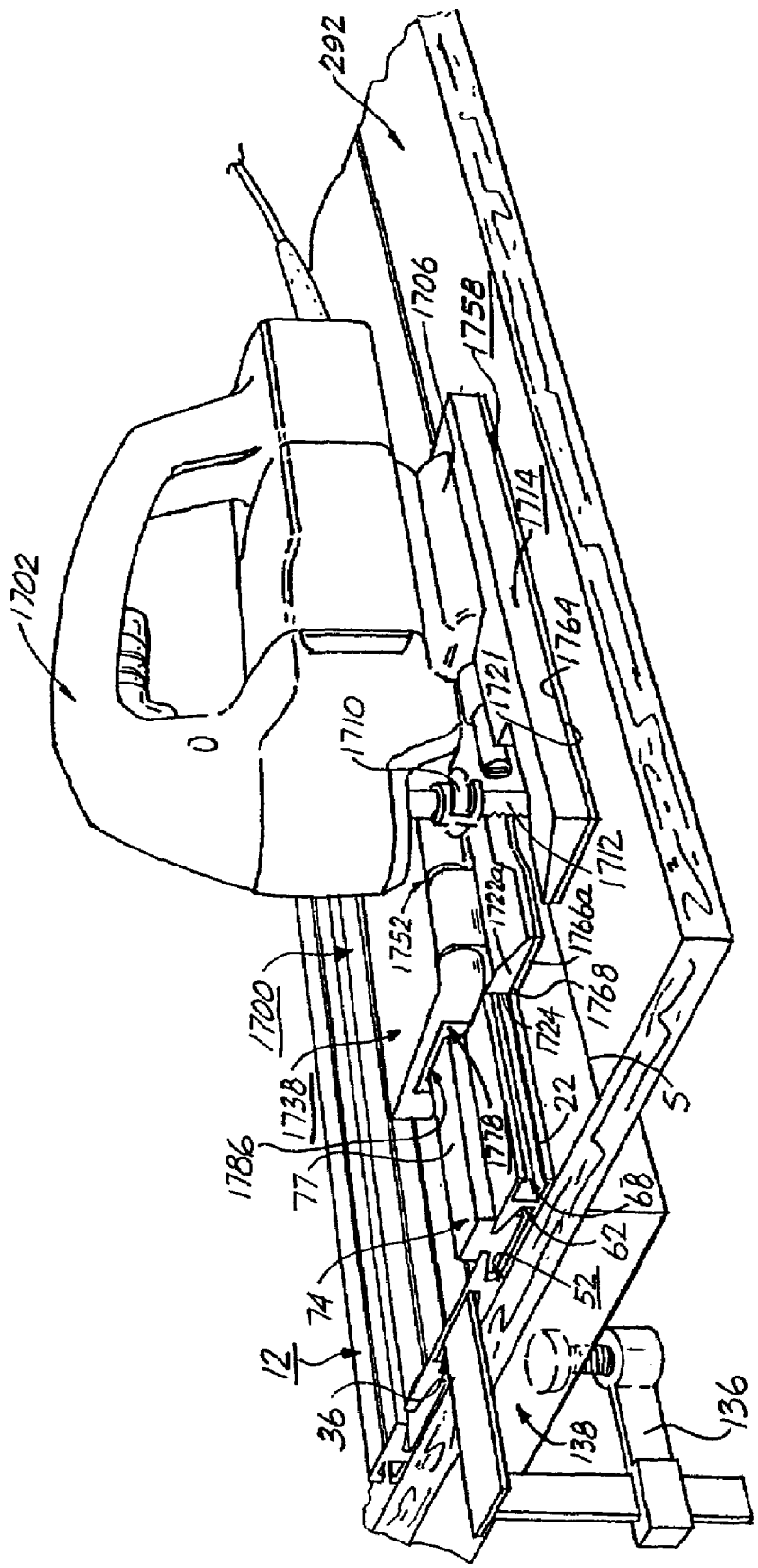
FIG. 26 is a perspective view of the jig saw attachment with the universal guide assembly of FIGS. 2 and 24, showing the jig saw in operational use.

Referring now to FIGS. 24 to 26, there is shown a jig saw attachment assembly 1700 for use with a conventional portable handheld jig saw (reciprocating saw) 1702. The jig saw 1702 includes a housing 1704 having a mounting base 1706 thereon. The mounting base 1706 includes a threaded mounting opening 1708 therethrough. The jig saw 1702 also includes a saw mounting member 1710 for locking a jig saw blade 1712 thereto. The jig saw attachment assembly 1700 includes an adapter member 1714 having a proximal end 1716 and a distal end 1718. The adapter member 1714 also includes a top wall surface 1720, a bottom wall surface 1721, front-end wall surfaces 1722a, 1722b, a rear end wall 1723, a first sidewall 1724 and a second sidewall 1725. The proximal end 1716 of adapter member 1714 includes a substantially rectangular-shaped cut-out opening 1726. The proximal end 1716 also includes a first beveled section 1728 and a second beveled section 1729 having the cut-out opening 1726 therebetween. The adapter member 1714 further includes an oval-shaped mounting opening 1730 being proximate to the distal end 1718. The first sidewall 1724 includes a pair of spaced-apart hinge elements 1732a, 1732b each having a longitudinal pin opening 1734a, 1734b therethrough. Hinge elements 1732a, 1732b are proximate to the proximal end 1716 of adapter member 1714. The bottom wall surface 1721 of adapter member 1714 includes a plurality of threaded mounting openings 1735 being adjacent to each of the sidewalls 1724, 1725, respectively (see FIG. 25a).

As shown in FIGS. 25 and 25a, the jig saw attachment assembly 1700 also includes an attachment arm 1738 having a top wall surface 1740, a bottom wall surface 1741, a front-end wall 1742, a rear end wall 1743, an outer sidewall 1744 and a convex sidewall 1745. The convex sidewall 1745 includes a centrally located male hinge element 1746 having a longitudinal pin opening 1748 therethrough. The spaced apart hinge elements 1732a and 1732b of adapter member 1714 receive the male hinge element 1746 of attachment arm 1738 therebetween, such that pin opening 1734a, 1748, 1734b are aligned with each other in order to receive a hinge pin 1750 therethrough in which to form a hinge member 1752 (see FIGS. 25 and 27). The hinge member 1752 allows the attachment arm 1738 to flex relative to the adapter member 1714 when in operational use. The bottom wall surface 1741 of attachment arm 1738 includes a centrally located tracking channel 1754 extending along a longitudinal axis from the front-end wall 1742 to the rear end wall 1743. The tracking channel 1754 includes a threaded mounting opening 1756.

The jig saw attachment assembly 1700 further includes an adapter base plate 1758 having a proximal end 1760 and a distal end 1762. The adapter base plate 1758 also includes a top wall surface 1764, a bottom wall surface 1765, front-end walls 1766a, 1766b, a rear end wall 1767 and sidewall edges 1766, 1769. The adapter base plate 1758 further includes a substantially rectangular-shaped cut-out opening 1770 being located at the proximal end 1760, an oval-shaped mounting opening 1774 being proximate to the distal end 1762, and a plurality of mounting openings 1776 being adjacent to each of the sidewall edges 1769, 1770, respectively (see FIG. 25). Additionally, the jig saw attachment assembly 1700 includes a jig saw sliding shoe 1778 having a top wall surface 1780, a bottom wall surface 1781, a front-end wall 1782, a rear end wall 1783 and sidewall 1784, 1785. The bottom wall surface 1782 of sliding shoe 1778 includes a centrally located tracking channel 1786 extending along a longitudinal axis from the front-end 1782 to the rear end wall 1783. The tracking channel 1786 includes a centrally located mounting opening 1788.

The assembly of the jig saw attachment assembly 1700 to the jig saw 1702 is shown in FIGS. 25 and 26 accordingly. The operator aligns the mounting openings 1776 of the adapter base plate 1758 to that of the threaded mounting openings 1736 of the adapter member 1714, such that machine screws 1790 are received within the aligned openings 1776 and 1736 therethrough and tightened accordingly, wherein the top wall surface 1764 of adapter base plate 1758 is adjacent and in contact with the bottom wall surface 1721 of adapter member 1714. The end wall surfaces 1766a, 1722a and 1766b, 1722b of the adapter base plate 1758, and adapter member 1714 are aligned with each other, respectively, such as the end wall surfaces 1766a and 1722a have a width E being slightly smaller than the width of edge bar 100. This was done in order to keep the cutting line S the same when the edge bar 100 is removed from the guide plate 12 prior to the operational use of the jig saw 1702. The operator now inserts the top wall surface 1780 of sliding shoe 1778 within the tracking channel 1754 of attachment arm 1738, such that the mounting opening 1788 of the sliding shoe 1778 is aligned with the threaded mounting opening where then a machine screw 1792 is received within the aligned openings 1788 and 1756 therethrough and tightened accordingly. A machine screw 1794 is then received through aligned the oval-shaped mounting openings 1774 and 1730 of the adapter base plate 1758 and the adapter member 1714, respectively, such that the machine screw 1794 is received and tightened within the threaded mounting opening 1708 of mounting base 1706 for the jig saw 1702. Thus, completing the attachment of the jig saw attachment assembly 1700 to the jig saw 1702 (see FIGS. 25 and 26).

In operation, as shown in FIG. 26, the operator clamps the universal guide assembly 10 to the work piece 292 and an optional work table 138 by the slide under clamps 136 in order to hold in position one or more guide plates 12, 12' to the work piece 292 and the work table 138 co-jointly. The slide bar 74 is appropriately positioned within tracking channel 62 of guide plate 12 and the edge bar 100 removed from tracking channel 68 after the guide plate 12 had been positioned at the cutting line S, as shown in FIG. 26. By doing this step, the cutting line S is still at its desired location and there is no need for repositioning the guide plate 12 in order to cut on the cutting line S. The operator now places the tracking channel 1786 of the jig saw sliding shoe 1778 on the upper surface 77 of slide bar 74, such that the sidewalls 1724, 1768 of the adapter member 1714 and that adapter base plate 1758, respectively, are adjacent and in contact with the side edge 22 of the guide plate 12 (see FIG. 26). The aforementioned assembly configuration eliminates the need for an off-set measurement, as the jig saw blade 1712 is in exact positioning for the blade 1712 to cut the predetermined saw line S. Previously, jig saw guides would require an off-set measurement and/or an off-set measurement device to perform the jig saw cut needed. To disengage the jig saw 1702 from the slide bar 74 on the guide plate 12, the operator lifts the jig saw 1702 in an upward direction, which then separates the jig saw 1702 and the jig saw attachment assembly 1700 from the work piece 292.

Figure 27:
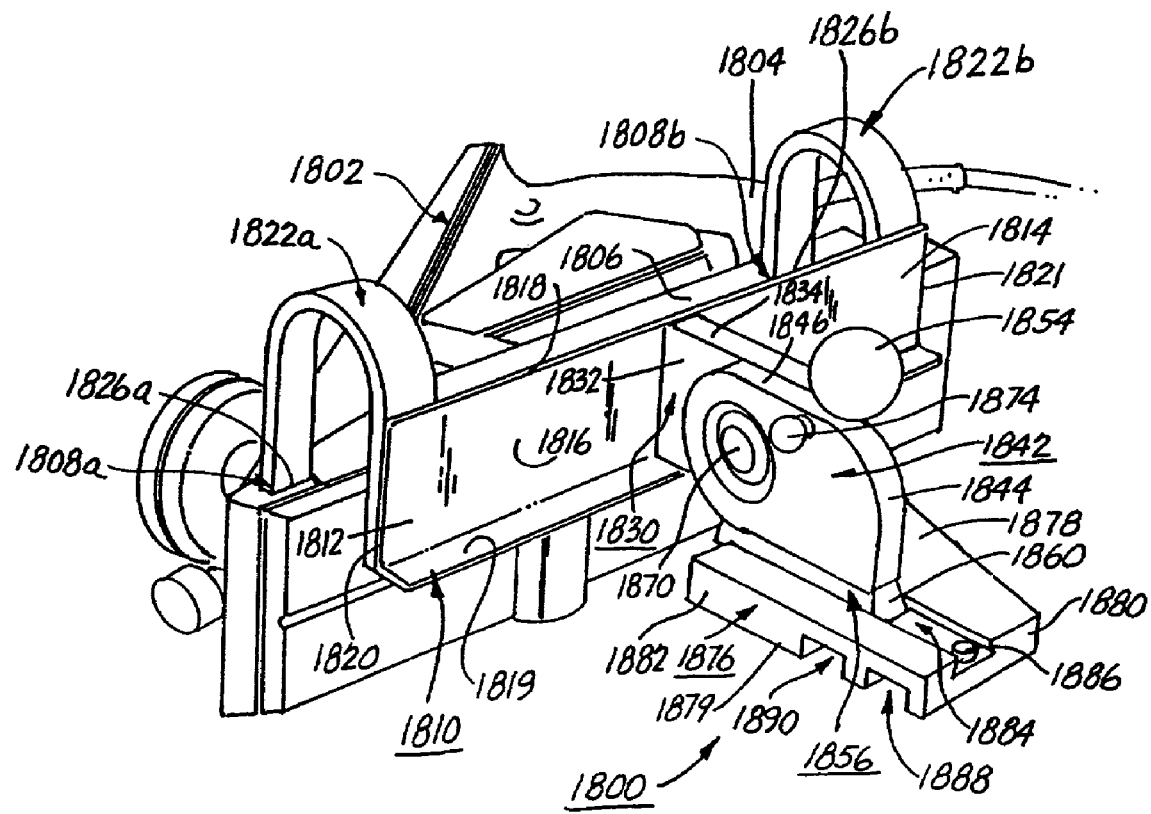
FIG. 27 is a perspective view of a planer attachment assembly with a handheld portable planer.
Figure 28:
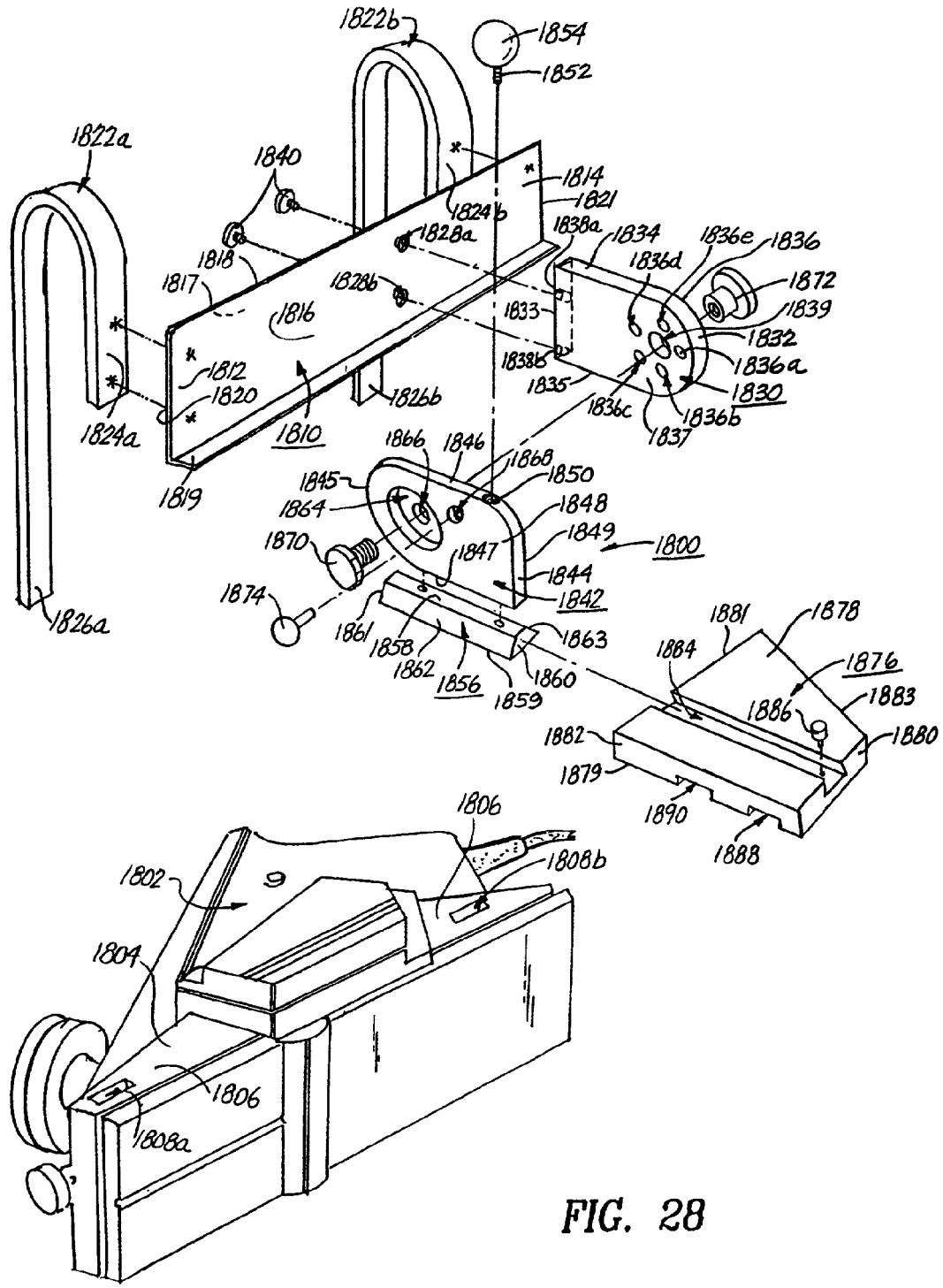
FIG. 28 is an exploded perspective view of the planer attachment assembly of FIG. 27.

With reference to FIGS. 27 to 29, there is shown a planer attachment assembly 1800 for use with a conventional portable, handheld joiner-planer 1802. The planer 1802 includes a housing 1804 having a sidewall 1806 with a pair of rectangular-shaped mounting openings 1808a, 1808b therein. The planer attachment assembly 1800 includes an L-shaped mounting plate 1810 having a proximal end 1812 and a distal end 1814. The L-shaped mounting plate 1810 also includes a front wall surface 1816, a rear wall surface 1817, an upper edge 1818, a lower ledge wall 1819, a proximal end edge 1820 and a distal end edge 1821. The rear wall surface 1817 includes a pair of J-shaped adjustable height bars 1822a, 1822b (having a rectangular cross-section). Each of the adjustable height bars 1822a, 1822b includes an attachment section 1824a, 1824b for connecting to the rear wall surface 1817 at the proximal and distal ends 1812, 1814, respectively, by connecting means in the form of welding, gluing and the like. Each of the adjustable height bars 1822a, 1822b includes an insertion section 1826a, 1826b, wherein the insertion sections 1826a, 1826b of the adjustable height bars 1822a, 1822b are received within the rectangular-shaped mounting openings 1808a, 1808b of the planar housing 1804 (see FIGS. 28 and 29). The L-shaped mounting plate 1810 further includes a pair of vertically aligned mounting openings 1828a, 1828b being centrally located on mounting plate 1810. The front wall surface 1816 includes a tilting arm base plate 1830 having a front curved perimeter edge 1832, a rear perimeter edge 1833, an upper perimeter edge 1834, a lower perimeter edge 1835, an outer wall surface 1836 and an inner wall surface 1837. The rear perimeter edge 1833 includes a pair of threaded mounting openings 1834a, 1834b. The tilting arm base plate 1830 also includes a plurality of adjustment openings 1838a, 1838b, 1836c, 1836d and 1836e and a control knob opening 1839. The mounting openings 1828a, 1828b of mounting plate 1810 are aligned with the threaded mounting openings 1838a, 1838b of base plate 1830 for receiving of machine screws 1840 therein, for the attachment of tilting arm base plate 1830 to the front wall surface 1816 of mounting plate 1810 (see FIG. 27).

Referring now to FIGS. 27 and 28, the planer attachment assembly 1800 also includes a tilting attachment arm 1842 having a front perimeter edge 1844, a curved rear perimeter edge 1845, an upper perimeter edge 1846, a lower perimeter edge 1847, an outer wall surface 1848, and an inner wall surface 1849. The upper perimeter edge 1846 includes a threaded mounting opening 1850 for receiving a threaded stem 1852 of a knob handle 1854. The lower perimeter edge 187 includes an attached dovetail-shaped sliding arm shoe 1856 having an upper wall surface 1858, a lower wall surface 1859, a front-end wall 1860, a rear end wall 1861 and beveled sidewalls 1862, 1863. The lower perimeter edge 1847 of attachment arm 1842 is attached to the upper wall surface 1858 of sliding arm shoe 1856 by connecting means in the form of welding, gluing and the like. The outer wall surface 1848 includes a recessed circular compartment 1864 having a centrally located control knob opening 1866 therein. The tilting attachment arm 1842 also includes an adjustment knob opening 1868 therethrough. The tilting attachment arm 1842 is connected to the tilting arm base plate 1830 by aligning the control knob opening 1866 therein. The tilting attachment arm 1842 is connected to the tilting arm base plate 1830 by aligning the control knob opening 1866 of attachment arm with the control knob opening 1839 of base plate 1830 for receiving a male control knob 1870 and a female control knob 1872, respectively, therethrough. The tilting attachment arm 1842 is further adjusted relative to the base plate 1830 by aligning the adjustment opening 1866 of attachment arm 1842 with one of the plurality of adjustment openings 1836a to 1836e of base plate 1850 for receiving a control adjustment pin 1874 therethrough. The control knob 1870 and 1872 are further tightened allowing the tilting attachment arm 1842 to be locked against the base plate 1830, wherein the inner wall surfaces 1849 and 1837 are in frictional contact with each other (see FIGS. 27 and 28).

Referring again to FIGS. 27 and 28, the planar attachment assembly 1800 further includes a sliding planer shoe 1876 having an upper wall surface 1878, a bottom wall surface 1879, a front-end wall 1880, a rear end wall 1881, a proximal sidewall 1882 and a distal angled sidewall 1883. The upper wall surface 1878 includes a dovetailed-shaped tracking channel 1884 having a depth control pin 1886 therein. The control pin 1886 is adjacent to the front-end wall 1880 (see FIG. 28). The tracking channel 1884 extends along a longitudinal axis from the front-end wall 1880 to the rear end wall 1881. The dovetailed-shaped tracking channel 1884 is for receiving the dovetailed-shaped sliding arm shoe 1856 of the tilting attachment arm 1842. The depth control pin 1886 is used for stopping the front-end wall 1860 of sliding arm shoe 1856 from moving any further forward within tracking channel 1884 (see FIG. 27). The bottom wall surface 1879 includes a 45° cut tracking channel 1888 and a 90° cut tracking channel 1890. The 45° cut tracking channel 1888 is used when a 45° beveled side edge (or other beveled side edges, e.g., 22.5°, 60°, etc.) is desired on the working piece 292, and the 90° cut tracking channel 1890 is used when a 90° straight edge is desired on the working piece 292 (see FIG. 29). The tracking channels 1888 and 1890 extend along a lateral axis from the proximal sidewall 1882 to the distal angled sidewall 1883. The planer attachment assembly 1800 is now in its assembled state ready for operational use thereof.

Typically, the planer 1802 is useful for off-set planing or trimming of work piece materials 292 that are too much for using a belt sander or too small for using a circular saw or reciprocating saw. For example, a typical use of the planer 1802 would be the planing of a wood door or a doorframe due to the dragging of the door/door frame structure. As such, the planer 1802 is more practical to use than the belt sander, as the planer is faster and gives straighter edges. The major drawback is the start and the finish of the planing process, the problem being at the starting and the finishing of the edges of the work piece there is no support to control the depth of planing. Normally, the user would extend each end of the work piece to avoid the aforementioned drawback, but this process requires extra labor and materials to accomplish this planing process. The use of the planer attachment assembly 1800 and the universal guide assembly 10 eliminates all of the aforementioned problems of planning, as the attachment assembly 1800 and guide assembly 10 provides depth control and secure guiding of the planer 1802 in all axial directions.

In operation, as shown in FIG. 29, the operator clamps the universal guide assembly 10 to the work piece 292 and an optional work table 138 by slide under clamps 136 in order to hold in position one or more guide plates 12, 12' to the work piece 292 and work table 138 co-jointly. Slide bar 74 and edge bar 100 are appropriately positioned within tracking channels 36 and 68, respectively, of guide plate 12. The operator then positions either the 45° cut tracking channel 1888 or the 90° cut tracking channel 1890 on the upper surface 77 of slide bar 74 (depending upon the type of edge, 22.5°, 45°, 60° or 90°, the user desires on the work piece 292). When in operational use, the user puts manual pressure on the knob handle 1854, such that the sliding arm shoe 1856 of the tilting attachment arm 1842 moves in a forwardly fashion within the tracking channel 1884, until the sliding arm shoe 1856 is stopped by the depth control pin 1886, while simultaneously moving the planer 1802 in a lateral motion/movement in order to plane the side edge 288 of work piece 292 by a rotating planer blade 1892 of planer 1802. To disengage the planer 1802 from the sliding bar 74 on guide plate 12, the user simply lifts the planer 1802 and the attached planer attachment assembly 1800 from the sliding bar 74 on guide plate 12 and from the work piece 292.

It should be understood that the embodiments described herein are merely exemplary and that a person skilled in the art may make many variations and modifications without departing from the spirit and scope of the present invention. All such variations and modifications are intended to be included within the scope of the invention as defined in the appended claims.

I claim:

1. A multi-function woodworking guide comprising an attachment assembly, for use with a work piece, work piece clamps and multiple power tools each coupled to said attachment assembly, wherein the multi-function woodworking guide comprises:
   a modular guide having at least one guide channel positioned essentially parallel and symmetrical to a longitudinal center axis of the modular guide;
   a guide bar adapted to removably couple one of the guide channels, wherein said attachment assembly slides along the guide bar in a longitudinal direction;
   said attachment assembly allowing movement of a selected power tool along opposing tracking bars with a first central tracking channel in direction perpendicular to the longitudinal direction, comprising:
      a sliding shoe comprising a bottom wall surface having a second central tracking channel extending along said longitudinal direction, an attachment arm further comprising a top wall surface having said opposing tracking bars with said first central tracking channel, said first central tracking channel and said pair of opposing tracking bars extending along the perpendicular direction, said second central channel having a threaded opening therein for receiving an adjustment knob;
      said attachment arm comprising a top surface, a bottom surface and a tool connecting end, said top surface having an elongated grooved channel extending in a longitudinal axis, said grooved channel further extending in depth from said top surface to said bottom surface, said bottom surface comprising a center tracking bar located between a pair of opposing tracking channels, said tracking bar and said opposing tracking channels extending along said perpendicular direction;
      said center tracking bar in sliding engagement with said first central tracking channel, and said opposing tracking channels in sliding engagement with said opposing tracking bars, for guiding movement of said selected power tool in said perpendicular direction;
      said adjustment knob for coupling said attachment arm with said sliding shoe and fixedly locking said sliding shoe in place;
   wherein the modular guide is adapted to guide movement of said selected power tool of the multiple power tools along each side of the modular guide, in one or more of said longitudinal and perpendicular directions, without requiring repositioning of the modular guide on the work piece, the movement of the selected power tool is guided as the attachment assembly slides.

2. The multi-function woodworking guide as recited in claim 1 wherein a pair of guide channels is positioned essentially parallel and symmetrical to the longitudinal center axis of the modular guide.

3. The multi-function woodworking guide as recited in claim 1 wherein a common cut line for the selected power tool is selected without requiring a measurement.

4. The multi-function woodworking guide as recited in claim 3 wherein said common cut line for the selected power tool is selected without requiring an offset measurement relative to an edge of the modular guide.

5. The multi-function woodworking guide as recited in claim 1 wherein the modular guide is continuously extendable in length by coupling an additional modular guide to the modular guide, whereby the multi-function woodworking guide does not limit length of a cut.

6. The multi-function woodworking guide as recited in claim 5 wherein the additional modular guide and the modular guide is coupled together with a coupling member, wherein said coupling member self aligns the additional modular guide to the modular guide.

7. The multi-function woodworking guide as recited in claim 6 wherein the coupling member is a guide bar adapted to removably couple to the guide channel, wherein the attachment assembly slides along the guide bar.

8. The multi-function woodworking guide as recited in claim 6 wherein the coupling member is secured with a set screw.

9. The multi-function woodworking guide as recited in claim 6 wherein the coupling member is secured with a spring force applied between the coupling member and the one of the guide channels.

10. The multi-function wood working guide as recited in claim 9 wherein the spring force is applied by a ball and spring assembly.

11. The multi-function woodworking guide as recited in claim 5 wherein the additional modular guide and the modular guide when coupled by use of one of the guide channels.

12. The multi-function woodworking guide as recited in claim 1 wherein the guide bar is self aligning in the guide channel.

13. The multi-function woodworking guide as recited in claim 2 wherein at least one pair of the guide channels is positioned on the bottom of the modular guide.

14. The multi-function woodworking guide as recited in claim 1 further comprising an integral measuring system for determining guided cut length.

15. The multi-function woodworking guide as recited in claim 1 further comprising a secondary guide having at least one secondary guide channel positioned essentially parallel and symmetrical to a longitudinal center of the secondary guide;

wherein the secondary guide together with the attachment assembly, guide movement the selected power tool when the attachment assembly slides along one of the secondary guide channel.

16. The multi-function woodworking guide as recited in claim 15 wherein the secondary guide is angularly adjustable relative to the modular guide.

17. The multi-function woodworking guide as recited in claim 1 further comprising a secondary attachment assembly adapted to couple to an additional selected power tool of the multiple power tools and slide along one of the guide channels;

wherein the modular guide together with the attachment assembly and the secondary attachment assembly, simultaneously and independently, guide movement of the selected power tool and the additional selected power tool.

18. The multi-function woodworking guide as recited in claim 2 wherein all of the guide channels are adapted to receive the attachment assembly.

19. The multi-function woodworking guide as recited in claim 2 wherein all of the guide channels are adapted to receive the work piece clamps wherein the work piece clamps do not interfere with functionality of the selected power tool.

20. The multi-function woodworking guide as recited in claim 1 further comprising a sliding square assembly adapted to be received by the at least one guide channel.

21. The multi-function woodworking guide as recited in claim 1 further comprising a sliding level assembly adapted to be received by the at least one guide channel.

22. The multi-function woodworking guide as recited in claim 1 further comprising a t-shaped extension adapted to be received by the at least one guide channel.

23. The multi-function woodworking guide as recited in claim 1 further comprising a quick release coupling from the at least one guide channel of the attachment assembly.

24. The multi-function woodworking guide as recited in claim 1 further comprising side clamps having an integral measuring system for determining distance from an edge of the work piece.

25. The multi-function woodworking guide as recited in claim 1, wherein a cut is made on the work piece along a common cut line without offset measurements from one or more sides of said guide bar.

26. The multi-functional woodworking guide as recited in claim 1, further comprising an anti-split sliding bar for preventing the work piece from one of splitting and splintering while cutting the work piece.

27. The multi-functional woodworking guide as recited in claim 26, wherein a dove-tailed receiving channel receives said anti-split sliding bar.

28. The multi-functional woodworking guide as recited in claim 1, wherein the modular guide enables the multiple power tools including a router, a circular saw, a planer, a belt sander, a drill, and a jig saw to share a common cut line.

\* \* \* \* \*